US010887830B2

(12) United States Patent
Horn et al.

(10) Patent No.: US 10,887,830 B2
(45) Date of Patent: Jan. 5, 2021

(54) CELL LEVEL ISOLATION FOR NETWORK SLICING AND NETWORK SHARING

(71) Applicant: Qualcomm Incorporated, San Diego, CA (US)

(72) Inventors: Gavin Bernard Horn, La Jolla, CA (US); Xipeng Zhu, San Diego, CA (US); Wanshi Chen, San Diego, CA (US); Masato Kitazoe, Hachiouji (JP); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/317,958

(22) PCT Filed: Aug. 10, 2017

(86) PCT No.: PCT/CN2017/096780
§ 371 (c)(1),
(2) Date: Jan. 15, 2019

(87) PCT Pub. No.: WO2018/028628
PCT Pub. Date: Feb. 15, 2018

(65) Prior Publication Data
US 2019/0239154 A1 Aug. 1, 2019

(30) Foreign Application Priority Data

Aug. 12, 2016 (WO) ................ PCT/CN2016/094861

(51) Int. Cl.
*H04W 48/18* (2009.01)
*H04W 72/04* (2009.01)
(Continued)

(52) U.S. Cl.
CPC ........... *H04W 48/18* (2013.01); *H04L 1/1812* (2013.01); *H04W 36/08* (2013.01);
(Continued)

(58) Field of Classification Search
CPC . H04W 48/18; H04W 72/0453; H04W 36/08; H04W 76/27; H04W 76/28;
(Continued)

(56) References Cited

U.S. PATENT DOCUMENTS 8,886,190 B2 11/2014 Damnjanovic et al.
9,491,755 B2 * 11/2016 Abu-Surra ............ H04W 56/00
(Continued)

FOREIGN PATENT DOCUMENTS

CN 103155644 A 6/2013
WO WO-2012048229 A1 4/2012
(Continued)

OTHER PUBLICATIONS

Qualcomm Incorporated. "Resource Isolation for RAN Part of Network Slice", 3GPP TSG-RAN WG2 Meeting #95 R2-165668, Aug. 26, 2016 (Aug. 26, 2016), section 3; 2 pgs.
(Continued)

*Primary Examiner* — Sharad Rampuria

(57) ABSTRACT

Methods, systems, and devices for wireless communication are described that provide for sharing or isolating network resources between multiple cells in a system. Resources are allocated to multiple cells and multiplexed according to a time division multiplexing (TDM) scheme where a portion of a component carrier is shared between multiple cells. The allocation of resources also includes splitting or sharing a portion of the time resources between two or more cells such that a subframe is allocated as a subframe shared between multiple cells or as a subframe dedicated for use by only a single cell.

37 Claims, 18 Drawing Sheets

(51) Int. Cl.
*H04W 76/28* (2018.01)
*H04W 76/27* (2018.01)
*H04L 1/18* (2006.01)
*H04W 36/08* (2009.01)
*H04W 84/04* (2009.01)

(52) U.S. Cl.
CPC ... *H04W 72/0446* (2013.01); *H04W 72/0453* (2013.01); *H04W 76/27* (2018.02); *H04W 76/28* (2018.02); *H04W 72/042* (2013.01); *H04W 84/042* (2013.01)

(58) Field of Classification Search
CPC ........... H04W 72/0446; H04W 72/042; H04W 84/042; H04W 72/04; H04W 72/12; H04W 76/00; H04L 1/1812; H04B 7/2123; H04B 7/2121; H04J 2203/0069; H04Q 2213/394
See application file for complete search history.

(56) References Cited

U.S. PATENT DOCUMENTS

| | | | |
|---|---|---|---|
| 9,894,679 B2* | 2/2018 | Huang | H04W 72/1263 |
| 2011/0317624 A1 | 12/2011 | Luo et al. | |
| 2014/0064133 A1 | 3/2014 | Kazmi et al. | |
| 2016/0302218 A1* | 10/2016 | Behravan | H04W 72/1205 |
| 2017/0331577 A1* | 11/2017 | Parkvall | H04L 5/1469 |

FOREIGN PATENT DOCUMENTS

| | | |
|---|---|---|
| WO | WO 2015/020607 A1 | 2/2015 |
| WO | WO-2015061987 A1 | 5/2015 |

OTHER PUBLICATIONS

Deutsche Telekom AG et al., "Requirements for Next Generation Access Technologies", 3GPP TSG RAN ad-hoc RPA160003, Jan. 29, 2016 (Jan. 29, 2016); 6 pgs.
International Search Report and Written Opinion—PCT/CN2016/094861—ISA/EPO—dated May 3, 2017.
International Search Report and Written Opinion—PCT/CN2017/096780—ISA/EPO—dated Oct. 26, 2017.
CATT: "Analysis on Enabling Network Slicing in RAN", 3GPP TSG RAN WG3 Meeting #91 bis, 3GPP Draft; R3-160780, 3rd Generation Partnership Project (3GPP), Mobile Competence Centre; 650, Route Des Lucioles; F-06921 Sophia-Antipolis Cedex; France, vol. RAN WG3, No. Bangalore, India; Apr. 11, 2016-Apr. 15, 2016, Apr. 2, 2016 (Apr. 2, 2016), pp. 1-5, XP051083038, Retrieved from the Internet: URL: http://www.3gpp.org/ftp/tsg_ran/WG3_lu/TSGR3_91bis/Docs/ [retrieved on Apr. 2, 2016] the whole document.
Supplementary European Search Report—EP17838758—Search Authority—The Hague—May 29, 2019.
CMCC (Rapporteur): "Summary of the description of candidate eICIC solutions", 3GPP TSG WG1 Meeting #62, R1-105081, Aug. 23-27, 2010, 6 Pages.
Nokia Siemens Networks et al., "Enhanced ICIC considerations for HetNet scenarios," 3GPP TSG Ran WG1 #61 bis Meeting, R1-103822, Dresden, Germany, Jun. 28-Jul. 2, 2010, 4 pages.
NTT Docomo: "eICIC Chairman's note," 3GPP TSG RAN WG1 Meeting #61bis, R1-104238, Dresden, Germany, Jun. 28-Jul. 2, 2010, 4 pages.
NTT Docomo: "Views on eICIC Schemes for Rel-10," 3GPP TSG RAN WG1 Meeting #62, R1-104942, Madrid, Spain, Aug. 23-27, 2010, 7 pages.

* cited by examiner

CELL LEVEL ISOLATION FOR NETWORK SLICING AND NETWORK SHARING

CROSS-REFERENCES

The present application for patent claims priority to PCT Patent Application No. PCT/CN2017/096780 by HORN et al., entitled "CELL LEVEL ISOLATION FOR NETWORK SLICING AND NETWORK SHARING", filed Aug. 10, 2017; and PCT Patent Application No. PCT/CN2016/094861 by HORN et al., entitled "CELL LEVEL ISOLATION FOR NETWORK SLICING AND NETWORK SHARING", filed Aug. 12, 2016, which are assigned to the assignee hereof and which are each incorporated by reference herein in their entirety.

INTRODUCTION

The following relates generally to wireless communication, and more specifically to cell level isolation for network slicing and network sharing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) or LTE-Advanced (LTE-A) system). A wireless multiple-access communications system may include a number of base stations, each simultaneously supporting communication for multiple communication devices, which may be otherwise known as user equipment (UE).

In some wireless communications systems, system resources for two cells may be allocated according to a frequency division multiplexing (FDM) scheme in which the two cells are allocated different carriers. In inter-operator carrier aggregation (CA), using an FDM allocation technique may limit the peak throughput as each of multiple operators is configured for use of only a single carrier. In some cases, this allocation technique may also require that the two cells use the same waveform and wireless communication protocols. As not all devices support all carriers or wireless communication protocols, this may result in UEs being unable to communicate with a base station that supports different carrier or wireless communication protocols.

SUMMARY

A method of wireless communication is described. The method may include configuring a first subset of a set of time resources as independent time resources for a first cell of a plurality of cells, configuring a second subset of the set of time resources as independent time resources for a second cell of the plurality of cells, determining whether a UE is configured for operating using one or both of the first cell or the second cell, identifying a subframe of the set of time resources for communication with the UE based at least in part on the determining, and communicating with the UE during the identified subframe.

An apparatus for wireless communication is described. The apparatus may include means for configuring a first subset of a set of time resources as independent time resources for a first cell of a plurality of cells, means for configuring a second subset of the set of time resources as independent time resources for a second cell of the plurality of cells, means for determining whether a UE is configured for operating using one or both of the first cell or the second cell, means for identifying a subframe of the set of time resources for communication with the UE based at least in part on the determining, and means for communicating with the UE during the identified subframe.

Another apparatus for wireless communication is described. The apparatus may include a processor, memory in electronic communication with the processor, and instructions stored in the memory. The instructions may be operable to cause the processor to configure a first subset of a set of time resources as independent time resources for a first cell of a plurality of cells, configure a second subset of the set of time resources as independent time resources for a second cell of the plurality of cells, determine whether a UE is configured for operating using one or both of the first cell or the second cell, identify a subframe of the set of time resources for communication with the UE based at least in part on the determining, and communicate with the UE during the identified subframe.

A non-transitory computer readable medium for wireless communication is described. The non-transitory computer-readable medium may include instructions operable to cause a processor to configure a first subset of a set of time resources as independent time resources for a first cell of a plurality of cells, configure a second subset of the set of time resources as independent time resources for a second cell of the plurality of cells, determine whether a UE is configured for operating using one or both of the first cell or the second cell, identify a subframe of the set of time resources for communication with the UE based at least in part on the determining, and communicate with the UE during the identified subframe.

Some examples of the method, apparatus, and non-transitory computer-readable medium described above may further include processes, features, means, or instructions for configuring a third subset of the set of time resources as shared time resources for the first cell and the second cell.

Some examples of the method, apparatus, and non-transitory computer-readable medium described above may further include processes, features, means, or instructions for identifying a first control region within one or more subframes of the third subset of the set of time resources, the first control region allocated for control information associated with the first cell. Some examples of the method, apparatus, and non-transitory computer-readable medium described above may further include processes, features, means, or instructions for identifying a second control region within the one or more subframes of the third subset of the set of time resources, the second control region allocated for control information associated with the second cell. Some examples of the method, apparatus, and non-transitory computer-readable medium described above may further include processes, features, means, or instructions for transmitting control information associated with the first cell in the first control region. Some examples of the method, apparatus, and non-transitory computer-readable medium described above may further include processes, features, means, or instructions for transmitting control information associated with the second cell in the second control region.

In some examples of the method, apparatus, and non-transitory computer-readable medium described above, the first control region comprises a first set of symbol periods of the one or more subframes and the second control region comprises a second set of symbol periods of the one or more subframes, the second set of symbol periods being non-overlapping with the first set of symbol periods.

In some examples of the method, apparatus, and non-transitory computer-readable medium described above, the first control region comprises a first set of sub-carriers and the second control region comprises a second set of sub-carriers, the second set of sub-carriers being non-overlapping with the first set of sub-carriers.

In some examples of the method, apparatus, and non-transitory computer-readable medium described above, the first control region comprises a first set of control channel elements (CCEs) within a control channel. In some examples of the method, apparatus, and non-transitory computer-readable medium described above, the second control region comprises a second set of CCEs within the control channel.

Some examples of the method, apparatus, and non-transitory computer-readable medium described above may further include processes, features, means, or instructions for scheduling a first subframe of the first subset of the set of time resources for downlink or uplink communication with at least one UE of a first set of UEs. Some examples of the method, apparatus, and non-transitory computer-readable medium described above may further include processes, features, means, or instructions for scheduling a second subframe of the second subset of the set of time resources for downlink or uplink communication with at least one UE of a second set of UEs, the second set of UEs being disjoint from the first set of UEs.

Some examples of the method, apparatus, and non-transitory computer-readable medium described above may further include processes, features, means, or instructions for configuring a third subset of the set of time resources as independent time resources for a third cell of the plurality of cells. Some examples of the method, apparatus, and non-transitory computer-readable medium described above may further include processes, features, means, or instructions for determining that a second UE may be configured for operating using the third cell. Some examples of the method, apparatus, and non-transitory computer-readable medium described above may further include processes, features, means, or instructions for identifying a second subframe of the set of time resources for communication with the second UE based at least in part on the determination that the second UE may be configured for operating using the third cell. Some examples of the method, apparatus, and non-transitory computer-readable medium described above may further include processes, features, means, or instructions for communicating with the second UE during the second subframe.

Some examples of the method, apparatus, and non-transitory computer-readable medium described above may further include processes, features, means, or instructions for determining at least one of a discontinuous reception (DRX) timer or a hybrid automatic repeat request (HARQ) timer for the first cell based at least in part on a number of subframes configured for the first cell.

Some examples of the method, apparatus, and non-transitory computer-readable medium described above may further include processes, features, means, or instructions for transmitting a subframe availability indication to the UE, the subframe availability indication indicating subframe partition information of the first cell and the second cell.

In some examples of the method, apparatus, and non-transitory computer-readable medium described above, the subframe availability indication may be transmitted via system information, a radio resource control channel, or a broadcast channel.

Some examples of the method, apparatus, and non-transitory computer-readable medium described above may further include processes, features, means, or instructions for transmitting, using a first waveform, a first synchronization signal or a first broadcast channel for the first cell using a portion of the first subset of the set of time resources.

Some examples of the method, apparatus, and non-transitory computer-readable medium described above may further include processes, features, means, or instructions for transmitting, using a second waveform different from the first waveform, a second synchronization signal or a second broadcast channel for the second cell using a portion of the second subset of the set of time resources.

In some examples of the method, apparatus, and non-transitory computer-readable medium described above, communicating with the UE comprises: transmitting, to the UE, a shared synchronization signal or a shared broadcast channel for the first cell and the second cell using at least a portion of the set of time resources.

In some examples of the method, apparatus, and non-transitory computer-readable medium described above, the first cell may be associated with a first public land mobile network (PLMN) and the second cell may be associated with a second PLMN different from the first PLMN.

Some examples of the method, apparatus, and non-transitory computer-readable medium described above may further include processes, features, means, or instructions for configuring the set of time resources according to a cell time division multiplexing (TDM) cycle comprising one or more radio frames, wherein the first and second subsets of the set of time resources comprise respective subsets of subframes of the one or more radio frames.

A method of wireless communication is described. The method may include receiving a subframe availability indication from a base station associated with at least one of a first cell and a second cell, the subframe availability indication indicating a configuration of a set of time resources for a plurality of cells including the first cell and the second cell, wherein the set of time resources comprises at least one of a first set of independent time resources for the first cell and a second set of independent time resources for the second cell, identifying a subframe within the set of time resources for communication with the base station based at least in part on the subframe availability indication, wherein the identified subframe is associated with at least one of the first cell and the second cell, and communicating with the base station during the subframe based at least in part on the identifying.

An apparatus for wireless communication is described. The apparatus may include means for receiving a subframe availability indication from a base station associated with at least one of a first cell and a second cell, the subframe availability indication indicating a configuration of a set of time resources for a plurality of cells including the first cell and the second cell, wherein the set of time resources comprises at least one of a first set of independent time resources for the first cell and a second set of independent time resources for the second cell, means for identifying a subframe within the set of time resources for communication with the base station based at least in part on the subframe availability indication, wherein the identified subframe is associated with at least one of the first cell and the second cell, and means for communicating with the base station during the subframe based at least in part on the identifying.

Another apparatus for wireless communication is described. The apparatus may include a processor, memory in electronic communication with the processor, and instructions stored in the memory. The instructions may be operable to cause the processor to receive a subframe availability indication from a base station associated with at least one of a first cell and a second cell, the subframe availability indication indicating a configuration of a set of time resources for a plurality of cells including the first cell and the second cell, wherein the set of time resources comprises at least one of a first set of independent time resources for the first cell and a second set of independent time resources for the second cell, identify a subframe within the set of time resources for communication with the base station based at least in part on the subframe availability indication, wherein the identified subframe is associated with at least one of the first cell and the second cell, and communicate with the base station during the subframe based at least in part on the identifying.

A non-transitory computer readable medium for wireless communication is described. The non-transitory computer-readable medium may include instructions operable to cause a processor to receive a subframe availability indication from a base station associated with at least one of a first cell and a second cell, the subframe availability indication indicating a configuration of a set of time resources for a plurality of cells including the first cell and the second cell, wherein the set of time resources comprises at least one of a first set of independent time resources for the first cell and a second set of independent time resources for the second cell, identify a subframe within the set of time resources for communication with the base station based at least in part on the subframe availability indication, wherein the identified subframe is associated with at least one of the first cell and the second cell, and communicate with the base station during the subframe based at least in part on the identifying.

In some examples of the method, apparatus, and non-transitory computer-readable medium described above, the subframe availability indication indicates that at least a portion of the set of time resources may be shared between the first cell and the second cell.

Some examples of the method, apparatus, and non-transitory computer-readable medium described above may further include processes, features, means, or instructions for identifying at least a portion of a carrier that may be shared between the first cell and the second cell based at least in part on the subframe availability indication.

In some examples of the method, apparatus, and non-transitory computer-readable medium described above, communicating with the base station during the subframe comprises: communicating with the base station using the identified portion of the carrier.

In some examples of the method, apparatus, and non-transitory computer-readable medium described above, identifying the subframe within the set of time resources comprises: identifying a common subframe shared between the first cell and the second cell based at least in part on the subframe availability indication.

In some examples of the method, apparatus, and non-transitory computer-readable medium described above, communicating with the base station during the subframe comprises: communicating with the base station during the identified common subframe.

In some examples of the method, apparatus, and non-transitory computer-readable medium described above, the subframe availability indication indicates that at least a portion of the set of time resources may be shared between each of the plurality of cells.

Some examples of the method, apparatus, and non-transitory computer-readable medium described above may further include processes, features, means, or instructions for monitoring a first control region for the first cell. Some examples of the method, apparatus, and non-transitory computer-readable medium described above may further include processes, features, means, or instructions for determining a first radio bearer for communication via the first cell based at least in part on monitoring the first control region. Some examples of the method, apparatus, and non-transitory computer-readable medium described above may further include processes, features, means, or instructions for communicating with a base station supporting the first cell using the determined first radio bearer.

Some examples of the method, apparatus, and non-transitory computer-readable medium described above may further include processes, features, means, or instructions for monitoring a second control region for the second cell. Some examples of the method, apparatus, and non-transitory computer-readable medium described above may further include processes, features, means, or instructions for determining a second radio bearer for communication via the second cell based at least in part on monitoring the second control region, the second radio bearer different from the first radio bearer. Some examples of the method, apparatus, and non-transitory computer-readable medium described above may further include processes, features, means, or instructions for communicating with a base station supporting the second cell using the determined second radio bearer.

Some examples of the method, apparatus, and non-transitory computer-readable medium described above may further include processes, features, means, or instructions for receiving a control channel configuration from the base station, the control channel configuration indicating a first control region for the first cell or a second control region for the second cell.

Some examples of the method, apparatus, and non-transitory computer-readable medium described above may further include processes, features, means, or instructions for determining a shared control region for the first cell and the second cell based at least in part on the received control channel configuration.

In some examples of the method, apparatus, and non-transitory computer-readable medium described above, the subframe availability indication indicates a number of subframes associated with the first cell. In some examples of the method, apparatus, and non-transitory computer-readable medium described above, at least one of a DRX timer or a HARQ timer for the first cell may be based at least in part on the number of subframes associated with the first cell.

In some examples of the method, apparatus, and non-transitory computer-readable medium described above, the subframe availability indication may be received via system information, a radio resource control channel, or a broadcast channel.

DETAILED DESCRIPTION

Figure 1:
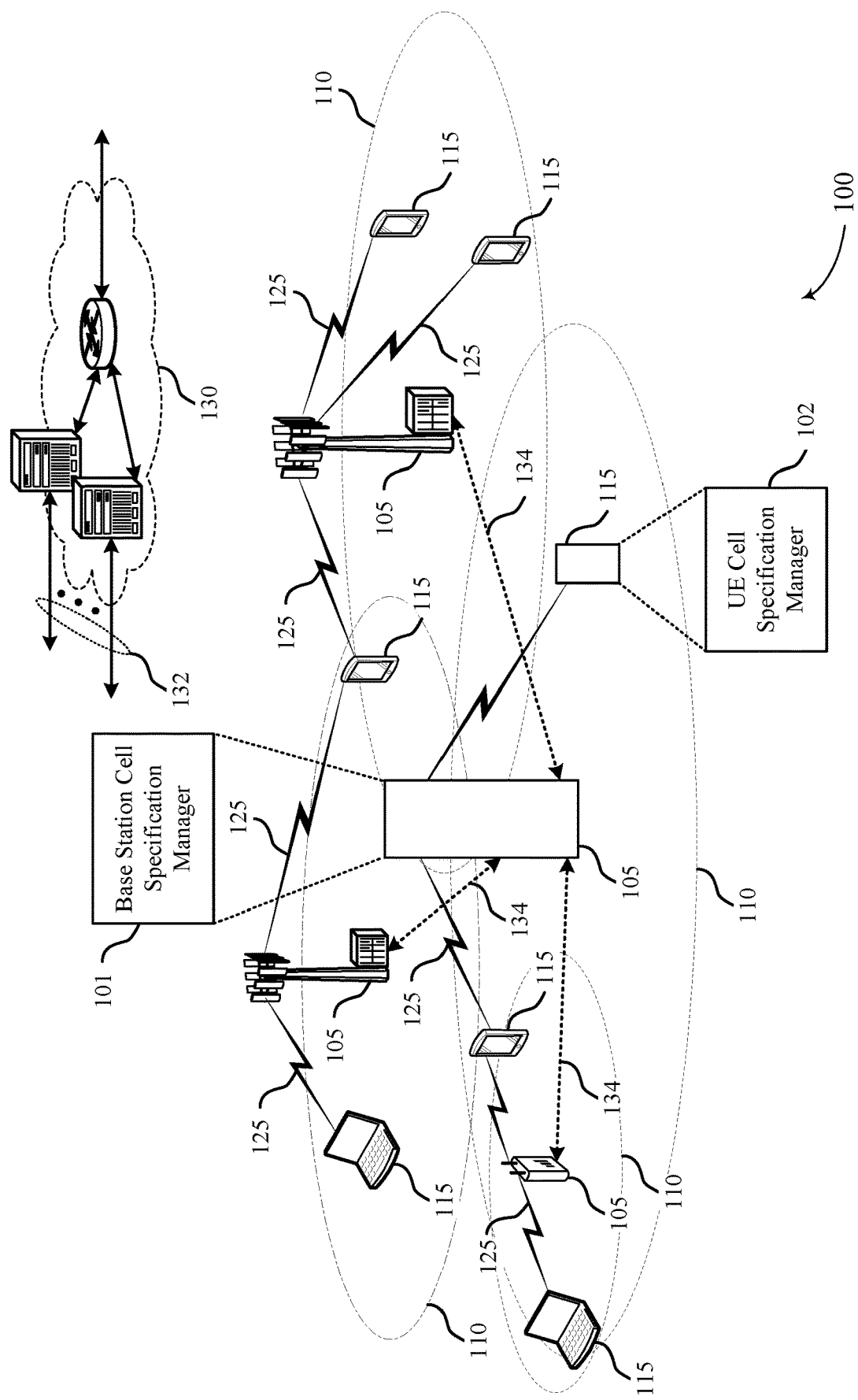
FIG. 1 illustrates an example of a system for wireless communication that supports cell level isolation for network slicing and network sharing in accordance with one or more aspects of the present disclosure.

In a wireless communications system, a RAN may be used to implement a given Radio Access Technology (RAT) (e.g., Wi-Fi, Bluetooth, LTE). A RAN may be a centralized RAN or a distributed RAN. In a centralized RAN, a base station may include a scheduler and a radio head (RH) and may be configured to both schedule and perform communication with a UE. In a distributed RAN, an access node controller (ANC) may be connected to a base station and configured to schedule communications between the base station and a UE. While in both scenarios the base station is capable of performing communication with a UE, in a distributed RAN, an ANC separate from the base station is used to schedule communications with the UE.

A carrier may be associated with a frequency range used for communication by a base station. A carrier may be divided or allocated into multiple slices, which may be associated with different operators, public land mobile networks (PLMNs), or virtual networks. Slices may be allocated a portion of independent time resources of the carrier and may be associated with independent core network functions (e.g., mobility management entity, serving gateway, etc.). Slices may be configured for support of different service types (e.g., enhanced mobile broadband (eMBB), ultra-reliable low-latency communications (URLLC), massive internet of things (MIoT), etc.). Some RANs include multiple cells served by one or more base stations. For example, a single base station may support communication for two or more cells, each of which may be associated with a different PLMN, operator, or virtual network. etc. Each cell may be configured for operation via one or more slices.

In some aspects, resources for two or more slices may be multiplexed according to a TDM scheme in which a portion of a carrier is shared between multiple slices over time. For example, a carrier may be dedicated for use by a single slice during one subframe and dedicated for use by a different slice in another subframe. In some examples, multiple cells may share a common subframe (e.g., a slice comprising the common subframe may be allocated for use by multiple cells).

Resource allocation may be determined by a core network node, a switching gateway, a base station, or an ANC of a RAN. The resource allocation may be indicated to a UE through a subframe availability indication. The subframe availability indication may be transmitted to a UE (e.g., from a base station) and may include information related to the partitioning of subframes (such as which cell(s) are allocated for communication in a particular subframe). The subframe availability indication may be broadcast by the base station in system information (SI) (e.g., in a system information block (SIB) or master information block (MIB), etc.). The UE may identify a set of resources (e.g., subframes or carrier bandwidth) associated with one or more cells based at least in part on the broadcast subframe availability indication. The subframe availability indication may include additional information regarding resources or access to cells associated with different subframe partitions. For example, the subframe availability indication may include access resources (e.g., resources for a random access channel) or access class barring (ACB) associated with a cell. The UE may also obtain information related to a control channel configuration, which may be transmitted (e.g., from a base station) in a primary synchronization signal (PSS), secondary synchronization signal (SSS), or physical broadcast channel (PBCH). The UE may use the information related to the control channel configuration to determine a control region within the identified set of resources.

Aspects of the disclosure are initially described in the context of a wireless communications system. Aspects of the disclosure are further illustrated by and described with reference to apparatus diagrams, system diagrams, and flowcharts that relate to cell level isolation for network slicing and network sharing.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a base station 105 and a UE 115 may communicate using one or more carriers. Each carrier can have a bandwidth of, e.g., 1.4, 3, 5, 10, 15 or 20 megahertz (MHz). In some cases, the number of carriers can be limited to, e.g., a maximum of five 20 MHz carriers, giving maximum aggregated bandwidth is 100 MHz. In frequency division duplexing (FDD), the number of aggregated carriers can be different in downlink and uplink. The individual carriers, also referred to as component carriers (CCs), may also have different bandwidths. For time division duplexing (TDD), the number of CCs as well as the bandwidths of each CC will may be the same for downlink and uplink. CCs may be arranged in a number of ways. For example, a CA configuration may be based on contiguous CCs within the same operating frequency band, i.e., intra-band contiguous CA. Non-contiguous allocations may also be used in which the CCs may be either be intra-band or inter-band.

A frame structure may be used to organize physical resources for a carrier. A frame may be a 10 millisecond (ms) interval that may be further divided into 10 equally sized sub-frames. Each sub-frame may include two consecutive time slots. Each slot may include 6 or 7 orthogonal frequency division multiplexed (OFDM) symbol periods (depending on the cyclic prefix). A resource element consists of one symbol period and one subcarrier (a 15 kilohertz (kHz) frequency range). A resource block may contain 12 consecutive subcarriers in the frequency domain and, for a normal cyclic prefix in each OFDM symbol, 7 consecutive OFDM symbols in the time domain (1 slot), or 84 resource elements (REs).

Synchronization (e.g., cell acquisition) may be performed using synchronization signals or channels transmitted by a synchronization source (e.g., a base station 105). Synchronization signals may include a PSS or an SSS. A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix (CP) length. An SSS may be used to acquire the full PCID and other system information (e.g., subframe index). The PBCH may be used to acquire additional system information needed for acquisition (e.g., bandwidth, frame index, etc.). In some examples, a base station 105 may transmit an SSS but not a PSS, or a combined synchronization signal.

After receiving the PSS and SSS, the UE 115 may receive a MIB, which may be transmitted in a downlink physical channel for broadcast information (e.g., a PBCH). The MIB may contain system bandwidth information, a system frame number (SFN), and a Physical Hybrid Automatic Repeat Request (HARQ) Indicator Channel (PHICH) configuration. After decoding the MIB, the UE 115 may receive one or more SIBs. Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIB5 include reselection information about neighboring LTE cells. SIB6 through SIB8 include reselection information about non-LTE neighboring cells. SIB9 includes the name of a Home eNB. SIB10 through SIB12 include emergency notification information (e.g., tsunami and earthquake warnings) and SIB13 includes information related to Multimedia Broadcast Multicast Services (MBMS) configuration.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput and reliability across a range of radio conditions (e.g., signal-to-noise conditions of a radio channel). In Incremental Redundancy HARQ, incorrectly received data may be stored in a buffer and combined with subsequent transmissions to improve the overall likelihood of successfully decoding the data. In some cases, redundancy bits are added to each message prior to transmission. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process and a limited number of HARQ processes may be used for a given communication link 125.

In some examples, a UE 115 may monitor a communication link 125 continuously for an indication that the UE 115 may receive data. In other cases (e.g., to conserve power and extend battery life), a UE 115 may be configured with a discontinuous reception (DRX) cycle. A DRX cycle consists of an "On Duration" when the UE 115 may monitor for control information (e.g., by enabling radio components such as a receiver and decoding a control channel) and a "DRX period" when the UE 115 may power down radio components. In some cases, a UE 115 may be configured with a short DRX cycle and a long DRX cycle in which a UE 115 enters a long DRX cycle if it is inactive for one or more short DRX cycles. The transition between the short DRX cycle, the long DRX cycle, and continuous reception may be controlled by an internal timer (e.g., a DRX Inactivity Timer, a DRX Short Cycle Timer, a DRX Long Cycle Timer) or by messaging from a base station 105. A UE 115 may receive scheduling messages on physical downlink control channel (PDCCH) during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may then resume a long DRX cycle associated with a DRX Long Cycle Timer.

Wireless communications system 100 may be an example of a distributed or centralized RAN and may include one or more transmission and reception points (TRPs), such as a base station 105. A TRP may be connected to the core network 130 via an ANC (not shown), which may include one or more additional TRPs and may be connected to other ANCs in the RAN (e.g., for RAN sharing, Radio-as-a-Service (RaaS), and other service specific ANC deployments). The TRP may advertise SI, such as a Global TRP ID, and may support multiple communication layers (e.g., Packet Data Convergence Protocol (PDCP), Radio Link Control (RLC), Media Access Control (MAC)). TRPs may be configured to individually or jointly (e.g., in conjunction with another TRP) communicate with one or more UEs 115.

In some examples, a base station 105 may include a base station cell specification manager 101. The base station cell specification manager 101 may be used to allocate resources for communication with UEs 115. Resources of a carrier may be multiplexed across multiple slices according to a TDM scheme and and configured for use by multiple cells. The base station cell specification manager 101 may also be used to transmit a subframe availability indication (e.g., to a UE 115) that indicates subframe partition information and a set of resources allocated for communication with one or more UEs 115.

In some examples, a UE 115 may include a UE cell specification manager 102, which may be used to identify a subframe configured for a particular cell from the set of resources allocated by a base station 105. The subframe may be used for uplink or downlink communication with a base station 105 in one cell or multiple cells. In some cases, the UE cell specification manager 102 may identify a common subframe shared between multiple cells and may communicate with a base station 105 using one or both of dedicated and common subframes.

Figure 2:
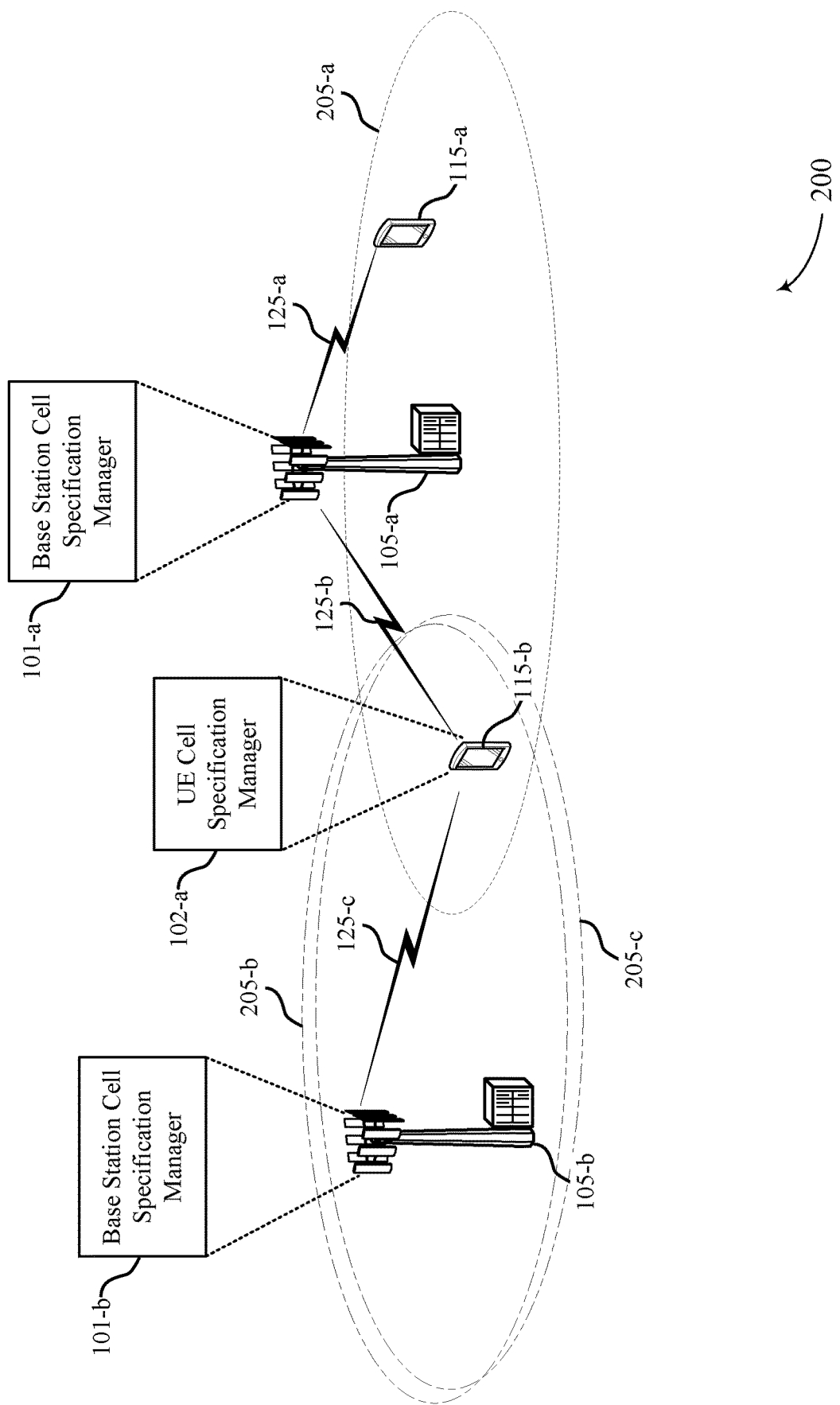
FIG. 2 illustrates an example of a radio access network (RAN) that supports cell level isolation for network slicing and network sharing in accordance with one or more aspects of the present disclosure.

FIG. 2 illustrates an example of a RAN 200 for cell level isolation for network slicing and network sharing in accordance with one or more aspects of the present disclosure. In FIG. 2, RAN 200 includes a base station 105-*a*, a base station 105-*b*, a UE 115-*a*, and a UE 115-*b*. Base stations 105-*a* and 105-*b* may be in communication with each other (e.g., through a backhaul link) and may be configured to support communication with multiple devices in multiple cells.

As shown in FIG. 2, base station 105-*a* supports communication via a first cell 205-*a* and is capable of communicating with UE 115-*a* using communication link 125-*a*. Base station 105-*a* may also support communication with UE 115-*b* via the first cell 205-*a* using communication link 125-*b*. Also in communication with UE 115-*b* is base station 105-*b*. In this example, base station 105-*b* supports communication via a second cell 205-*b* and third cell 205-*c*, which may be associated with slices of a carrier. Base station 105-*b* may communicate with UE 115-*b* via the second cell 205-*b* or the third cell 205-*c* over communication link 125-*c*. In some examples, base station 105-*a* and base station 105-*b* may be synchronized to provide communication via multiple cells 205 which are associated with slices of the same carrier, or a single base station, such as base station 105-*b*, may support communication for multiple synchronized cells, such as second cell 205-*b* and third cell 205-*c*, as shown.

In this example, as UE 115-*b* is located within the coverage areas of the first cell 205-*a*, the second cell 205-*b*, and the third cell 205-*c* and may be capable of communicating with base stations 105-*a* and 105-*b* via any of the first, second, or third cells 205. To communicate with UE 115-*b*, base station 105-*a* may include a base station cell specification manager 101-*a* which may be used, separately or in conjunction with a base station cell specification manager 101-*b* of base station 105-*b*, to allocate resources for at least one of the first cell 205-*a*, the second cell 205-*b*, or the third cell 205-*c*. The allocation of resources may involve scheduling multiple subframes dedicated for communication by one of the first cell 205-*a*, the second cell 205-*b*, or the third cell 205-*c* and in some cases, multiple cells 205 may be scheduled in a common subframe.

RAN 200 may have a system bandwidth, which may include one or more carriers. Carriers may be configured with independent time resources for each of a set of network slices. Each network slice may be assigned to a cell and different cells may be configured to operate via different network slices. For example, slices of one carrier may be allocated to one or more of the first cell 205-*a*, the second cell 205-*b*, or the third cell 205-*c*. The allocated band may be shared by the first cell 205-*a*, the second cell 205-*b*, or the third cell 205-*c* and a UE 115-*b* may communicate with base station 105-*a* or base station 105-*b* using the shared carrier.

Base station cell specification managers 101 may also be used to determine and transmit a control channel configuration to a UE 115 which may include information indicating a control region within the set of resources allocated for the first cell 205-*a*, the second cell 205-*b*, or the third cell 205-*c*. In some cases, a base station 105 may receive the control channel configuration from a core network entity for transmission to UE 115. Using a UE cell specification manager 102-*a*, UE 115-*b* may determine or otherwise obtain control information for one or more cells 205, which may be used to communicate with a base station 105-*a* or 105-*b* associated with one of the first cell 205-*a*, the second cell 205-*b*, or the third cell 205-*c*. For example, the UE 115-*b* may be configured to communicate via the second cell 205-*b*, and the UE cell specification manager 102-*a* may identify a set of resources of the carrier allocated for a slice associated with the second cell 205-*b*. The set of resources may include one or more subframes for each radio frame. Other resources (e.g., other sets of subframes, etc.) of the carrier may be allocated to other slices, which may be assigned or shared between multiple cells.

According to some aspects, the set of resources allocated for each of the number of cells 205 may be indicated to a core network entity (e.g., from a base station 105). The core network entity may use this resource allocation when determining timing information such as the timing of downlink data, signaling, or paging delivery. The core network entity may also use this resource allocation to set timers for the base stations 105 or the UEs 115 (e.g., a timer for a response from a UE 115 to data, control, or paging delivery). For example, a response timer may be set based on a utilization factor for a cell associated with a network. In some cases, such timing information may be reported to a base station 105 or UE 115 (e.g., from the core network entity).

In some examples, the number of cells 205 may be larger than the number of subframes per radio frame. For example, wireless communications system 200 may configure slices to operate according to a TDM cycle of two radio frames and each radio frame may include 10 subframes. In one example, each cell 205 may be allocated one or more subframes within the cycle of two radio frames via the configured slices and in such instances, up to 20 individual cells 205 may share the set of time resources spanning two radio frames. In another example, the wireless communications system 200 may configure slices to operate according to a TDM cycle of any number of radio frames. The number of radio frames in a TDM cycle may depend on the number of cells 205 sharing the set of time resources and may be indicated, for example, in system information for the cells. For example, a TDM cycle may be 4 radio frames, each having 10 subframes. In such cases, up to 40 individual cells may share the set of time resources spanning 4 radio frames. The number of radio frames per TDM cycle may vary (e.g., over time) to accommodate any number of cells being active at a given time.

A UE 115 may be configured to communicate using resources of a first network slice assigned to a first cell 205. In some examples, a UE 115 may wish to perform communication over additional slices (e.g., to increase throughput, to avoid interference on resources of the first network slice, to increase signal quality) and may request to communicate using resources of a second network slice. If the resources of the second network slice are assigned to a second cell 205 different from the first cell 205, a network node (e.g., a base station 105) may configure the UE 115 for communication using the second cell 205. For example, the network may configure the second cell 205 as a second primary cell (e.g., in a dual-connectivity mode) or a secondary cell (e.g., using carrier aggregation) for the UE 115.

In some cases, a third network slice may be configured and (e.g., by a network node such as a base station 105 or a core network entity) associated with a set of resources (e.g., independent resources in time). Although the third network slice may be associated with resources different from those of the first and second network slices, the third network slice may still be assigned to the first cell 205, the second cell 205, or a combination thereof. For example, the third network slice may be assigned to the first cell 205 and a UE 115 configured for communication via the first cell 205 may perform handover to a third cell 205 different from the first and second cells 205. The third cell 205, however, may not be configured to support the first cell 205 or the second cell 205. In such instances, the UE 115 may be configured for communication via the third cell 205 and another cell (e.g., a fourth cell 205) that corresponds to a network slice assigned to the first cell 205 (or the second cell 205). In one example, the UE 115 may be configured to communicate via a fourth cell 205 that corresponds to a fourth network slice assigned to the first cell 205. The network may configure the fourth cell 205 as a second primary cell (e.g., in a dual-connectivity mode) or a secondary cell (e.g., using carrier aggregation) for the UE 115.

Figure 3A:
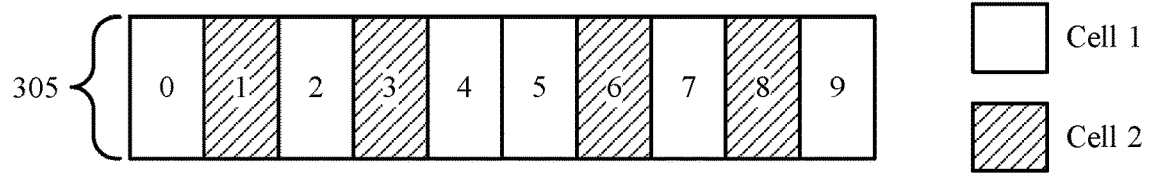
FIGS. 3A through 3C illustrate examples of subframe partitioning schemes that supports cell level isolation for network slicing and network sharing in accordance with one or more aspects of the present disclosure.
Figure 3B:
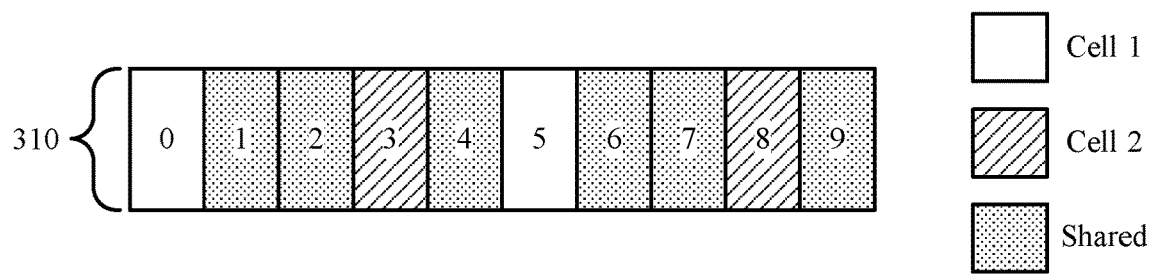
Figure 3C:
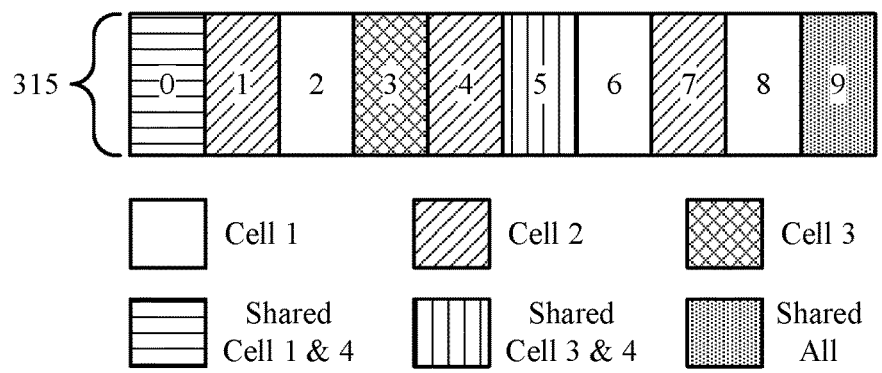

FIGS. 3A-3C illustrate examples of subframe partitioning schemes 300 for cell level isolation for network slicing and network sharing in accordance with one or more aspects of the present disclosure.

In FIG. 3A, subframe partitioning scheme 300-a shows subframes 0 through 9 of a radio frame for carrier 305. In this example, the subframes of a frame are divided into two slices, and each slice is dedicated for communication for only one cell, either cell 1 or cell 2. For example, cell 1 is allocated for communication in a first slice corresponding to subframes 0, 2, 4, 5, 7, and 9, while cell 2 is allocated for communication in in a second slice corresponding to subframes 1, 3, 6, and 8. Each subframe may have associated control regions (not shown) and may be allocated for uplink communication, downlink communication, or both. Cell 1 may be associated with a first operator, PLMN, or virtual network, while cell 2 may be associated with a different operator, PLMN, or virtual network.

In some aspects, a UE configured for operation via one of cell 1 or cell 2 may skip monitoring of a control channel during subframes which are not allocated for that cell. For example, a UE may be configured for operation using cell 1 and may receive a subframe availability indication from a base station indicating information relating to subframe partitioning scheme 300-a. In this case, the UE may determine (e.g., from the subframe availability indication) resources allocated to cell 1. Based on the determination, the UE may skip monitoring the carrier for the subframes associated with only cell 2, which are subframes 1, 3, 6, and 8 in this example. In doing so, the UE may save power by only monitoring control channels and performing blind decoding on subframes allocated to the cell for which the UE is configured.

In some aspects, one slice may be assigned to multiple cells. As shown in FIG. 3B for example, subframe partitioning scheme 300-b includes subframes 0 through 9 of a radio frame for carrier 310. In subframe partitioning scheme 300-b, the subframes of a frame are divided into three slices. Some of subframes 0 through 9 are dedicated for use by a single cell (either cell 1 or cell 2) and other subframes are shared subframes for use by both cell 1 and cell 2. For instance, cell 1 is allocated for communication via a first slice corresponding to subframes 0 and 5, while cell 2 is allocated for communication via a second slice corresponding to subframes 3 and 8. The third slice corresponds to subframes 1, 2, 4, 6, 7, and 9, which are allocated as shared subframes and may be used for communication by cell 1 and cell 2 concurrently. Where cell 1 and cell 2 are collocated at a base station or scheduled by the same controller (e.g., ANC, etc.), scheduling for cell 1 and cell 2 in shared subframes may be coordinated to reduce or eliminate scheduling collisions between cells. However, cell 1 and cell 2 may not be coordinated, and the same resources of the common subframe may be scheduled to multiple UEs concurrently. In this instance, interference may be mitigated by interference management techniques such as beamforming, interference cancellation, or the like.

In some aspects, a UE associated with one of cell 1 or cell 2 may skip monitoring the carrier during subframes which are not allocated for that cell. For example, a UE may be configured for operation using cell 2 and may receive a subframe availability indication from a base station indicating information relating to subframe partitioning scheme 300-b. In this case, the UE may determine (e.g., from the subframe availability indication) resources such as subframes allocated for communication via cell 2. Based on the determination, the UE may skip monitoring of the subframes associated with only cell 1 and may monitor shared subframes as well as subframes dedicated for cell 2. In this example, the UE may monitor subframes 1 through 4 and 6 through 9 as subframes 0 and 5 are allocated for communication in cell 1.

In some examples, a subframe partitioning scheme may include more than two cells, and two or more cells may share a common subframe. As shown in FIG. 3C for example, subframe partitioning scheme 300-c includes subframes 0 through 9 for a radio frame of carrier 315. Subframe partitioning scheme 300-c includes six slices, some of which are dedicated for use by a single cell (either cell 1, cell 2, or cell 3) while other slices are shared for use by multiple cells. For instance, cell 1 is allocated for communication via a first slice corresponding to subframes 2, 6, and 8, cell 2 is allocated for communication via a second slice corresponding to subframes 1, 4, and 7, while cell 3 is allocated for communication via a third slice corresponding to subframe 3. In this example, cell 4 has no dedicated subframes. The remaining slices are allocated as shared subframes between two or more cells. For instance, a fourth slice corresponding to subframe 0 is allocated for cells 1 and 4, a fifth slice corresponding to subframe 5 is allocated for cells 3 and 4, and a sixth slice corresponding to subframe 9 may be used for communication by any of cell 1, cell 2, cell 3, and cell 4.

In some aspects, a UE configured for communication via one or more cells may skip monitoring the carrier during subframes which are not allocated for that cell. For example, a UE may be configured for operation via cells 2 and 4 and may receive a subframe availability indication from a base station indicating information relating to subframe partitioning scheme 300-c. In this case, the UE may determine (e.g., from the subframe availability indication) resources such as subframes allocated for communication via cells 2 and 4. Based on the determination, the UE may skip monitoring of the subframes associated with only cells 1 and 3 and may monitor shared subframes as well as subframes dedicated for cells 2 and 4. In this example, the UE may monitor subframes 0, 1, 4, 5, 7, and 9 as subframes 2, 3, 6, and 8 are not allocated for communication in any of cells 2 or 4.

In some aspects, HARQ may be performed separately for dedicated subframes and shared subframes. For example, HARQ operations may be performed such that a transport block has a corresponding HARQ completely fall into either dedicated subframes or shared-subframes, but not both. This may help manage high priority traffic having similar interference characteristics. In other cases, HARQ operations may be performed using both dedicated and shared subframes.

Channel state information (CSI) reporting may also be performed separately for dedicated subframes and shared subframes. This may allow for CSI reporting of different interference characteristics based on whether the subframe is a dedicated subframe or shared subframe. For example, CSI may be reported for a first subframe set including the dedicated subframes for a single cell separately from CSI for a second subframe set including shared subframes. In such instances, a modulation and coding scheme (MCS) may be selected based on the different interference characteristics of dedicated or shared subframes.

Further, a DRX timer or a HARQ timer may be determined by a UE operating in a given cell based on the number of subframes allocated for that cell. For example, a HARQ timer for a UE operating in a cell may span 3 subframes. If the UE was operating in cell 1 using subframe partitioning scheme 300-a, a UE may receive a transmission in subframe 0 and wait 3 subframes allocated to cell 1 before sending a HARQ message. In this case, as subframes 1 and 3 are allocated for cell 2, the UE may wait until subframe 5 before sending a HARQ message, which is 3 subframes allocated to cell 1 after subframe 0. A UE may also consider shared subframes when waiting for a HARQ or DRX timer to expire. For example, if a UE is operating in cell 2 and using subframe partitioning scheme 300-b, a DRX Inactivity Timer may be set to 5 subframes during which the UE monitors a control channel for an indication of data to be received. In this instance, the UE may start the DRX Inactivity Timer at subframe 1, which is a shared subframe. Instead of monitoring all subframes, the UE may only monitor and consider subframes 1, 2, 3, 4 and 6 prior to expiration of the DRX Inactivity Timer. If no data indication is received by subframe 6, the UE may enter a long DRX cycle.

Although a number of subframe partitioning schemes are shown in FIGS. 3A-3C, various other resource partitioning schemes may be considered without departing from the scope of the present disclosure. For example, resource partitioning may be performed based on a different transmission time interval (TTI), which may be one or more subframes, or fractions of subframes (e.g., one or more symbol periods, etc.).

Figure 4A:
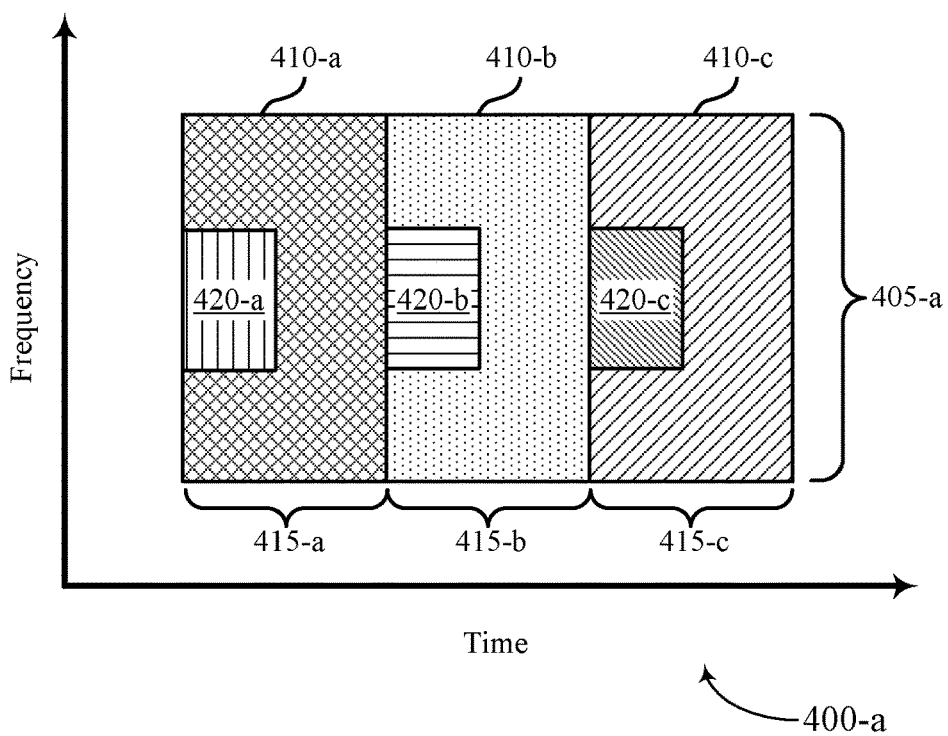
FIGS. 4A and 4B illustrate examples of a resource allocation scheme that supports cell level isolation for network slicing and network sharing in accordance with one or more aspects of the present disclosure.
Figure 4B:
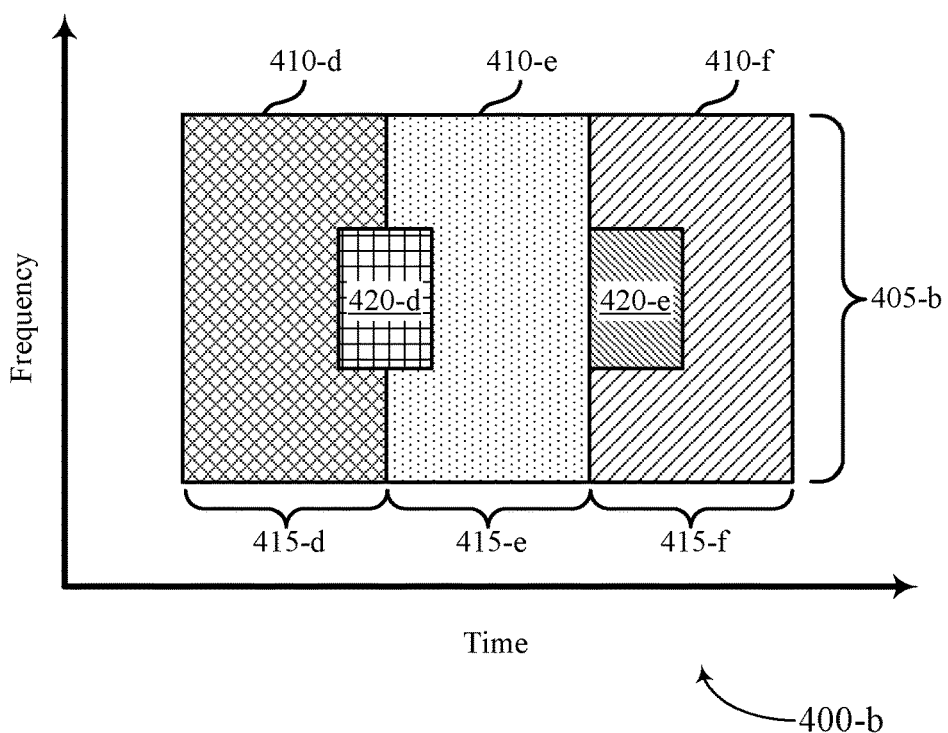

FIGS. 4A and 4B illustrate examples of resource allocation schemes 400 for cell level isolation for network slicing and network sharing in accordance with one or more aspects of the present disclosure. Resource allocation schemes 400-a and 400-b may be assigned by a network node such as a base station, and may be conveyed semi-statically (e.g., via a radio resource control (RRC) message) or dynamically (e.g., based on cell load or network traffic) and may be transmitted in downlink control information (DCI) within a PDCCH (e.g., providing an allocation for the next frame).

In FIG. 4A, a frequency vs. time plot is shown having resources allocated for multiple cells multiplexed according to a TDM scheme over carrier 405-a. In this example, a first slice 415-a is allocated for a first cell 410-a, a second slice 415-b is allocated for a second cell 410-b, and a third slice 415-c is allocated for a third cell 410-c. In some examples, the multiple cells 410 may be allocated resources based on a number of virtual networks, operators, base stations, served UEs, PLMNs, etc. For example, third cell 410-c may be allocated for communication in slice 415-c for a PLMN dedicated to public safety, while a second cell 410-b may be allocated for communication in slice 415-b for a different PLMN associated with a given network operator.

In FIG. 4A, each cell 410 is associated with corresponding synchronization regions 420 associated with different cell IDs. The synchronization regions 420 may be used for transmission of one or more synchronization channels associated with the cell 410 and the synchronization region may be allocated a number of symbols of a slice 415 and/or a portion of the carrier 405. For example, a base station may transmit a PSS or an SSS associated with cell 410-a within synchronization region 420-a. The same or a different base station may transmit a PSS or an SSS associated with cells 410-b and 410-c within synchronization regions 420-b and 420-c, respectively. A UE may receive the synchronization signal transmitted in synchronization region 420-b in order to obtain SI related to the cell 410-b. In some examples, a UE may receive a channel configuration from a base station (or ANC) or may determine a synchronization region 420 for a given cell 410 based on the channel configuration.

In some cases, a synchronization region 420 may be shared between one or more cells 410. For example, in FIG. 4B, a frequency vs. time plot is shown having a resource allocation scheme 400-b for multiple cells multiplexed according to a TDM scheme over carrier 405-b. In the example illustrated in FIG. 4B, slice 415-d is allocated for a fourth cell 410-d, slice 415-e is allocated for a fifth cell 410-e, and slice 415-f is allocated for a sixth cell 410-f.

In FIG. 4B, synchronization region 420-d is shared between fourth cell 410-d and fifth cell 410-e. In this example, the cells 410-d and 410-e may share a common synchronization region over which one or more synchronization channels (e.g., PSS or SSS) may be transmitted. Synchronization region 420-e may be associated with sixth cell 410-f and may be used for communication of one or more synchronization channels associated with the sixth cell 410-f.

In this example, a UE may receive a synchronization channel transmitted in synchronization region 420-d in order to obtain information related to one or both of cells 410-d and 410-e.

Each cell may be associated with a cell ID. The cell ID may be different for each cell 410 and each cell 410 may also have dedicated random access channel (RACH) resources that may or may not fall within the resources allocated for the cell 410. Such information may be obtained using dedicated SI. In other cases (e.g., where PSS/SSS/BCH is shared), multiple cells 410 may share common SI that include a list of the different cell IDs. In this case, different cells may share the same PCID but have different virtual cell IDs. In addition, multiple cells may share the same RACH resources and SI may be used to indicate resources for each cell.

In some examples, fourth cell 410-d and fifth cell 410-e may transmit synchronization signals or broadcast channels that are common to both the fourth cell 410-d and the fifth cell 410-e. For instance, the fourth cell 410-d and the fifth cell 410-e may each transmit one or more synchronization signals or broadcast channels that have the same SI. In one case, a portion of synchronization region 420-d may be allocated for synchronization signals or broadcast channels for fourth cell 410-d and a different portion of synchronization region 420-d may be allocated for synchronization signals or broadcast channels for fifth cell 410-e. For instance, the fourth cell 410-d may transmit synchronization signals or broadcast channels in the first half of symbols in synchronization region 420-d, while the fifth cell 410-e may transmit synchronization signals or broadcast channels in the second half of symbols in synchronization region 420-d. In another example, the fourth cell 410-d may transmit synchronization signals or broadcast channels using half the sub-carriers in synchronization region 420-d, while the fifth cell 410-e may transmit synchronization signals or broadcast channels using the other half of the sub-carriers in synchronization region 420-d. Some sub-carriers or symbols may be allocated for only synchronization signals or only broadcast channels associated with the fourth cell 410-d or the fifth cell 410-e.

In another example, one fourth cell 410-d and fifth cell 410-e may transmit synchronization signals or broadcast channels in synchronization region 420-d which may be used by one or more UEs to obtain SI for both fourth cell 410-d and fifth cell 410-e. For instance, fourth cell 410-d may transmit synchronization signals or broadcast channels in the synchronization region 420-d which may be received by the UE. Using the received synchronization signals or broadcast channels, the UE may determine SI for both fourth cell 410-d and fifth cell 410-e.

In some cases, both fourth cell 410-d and fifth cell 410-e may transmit synchronization signals that share the same SI in synchronization region 420-d. Based on the common SI, a UE associated with the fourth cell 410-d may determine resources allocated for a PBCH of the fourth cell 410-d and may listen during those resources to obtain additional SI specific to the fourth cell 410-d within the PBCH. Also using the common SI, a UE associated with the fifth cell 410-e may determine resources allocated for a PBCH of the fifth cell 410-e and may listen during those resources to obtain additional SI specific to the fifth cell 410-e within the PBCH.

In some cases, resource allocation schemes 400 may be used for inter-PLMN network sharing. For example, if two or more operators are deployed partially over the same coverage area or using the same base station, allocating resources as shown in FIGS. 4A and 4B may improve network performance (e.g., peak burst throughput, load balancing) while still isolating one PLMN from another.

In subframe partitioning schemes having shared subframes, such as subframe partitioning schemes 300-b and 300-c of FIGS. 3B and 3C, there may be control channel regions allocated for each cell in the shared subframe. In such cases, an indication may be transmitted to a UE communicating during the shared subframe which indicates the resources being utilized by the control channels and the UE may rate match around those resources. Such indication may be done semi-statically (e.g., through RRC) or dynamically (e.g., in DCI).

Figure 5A:
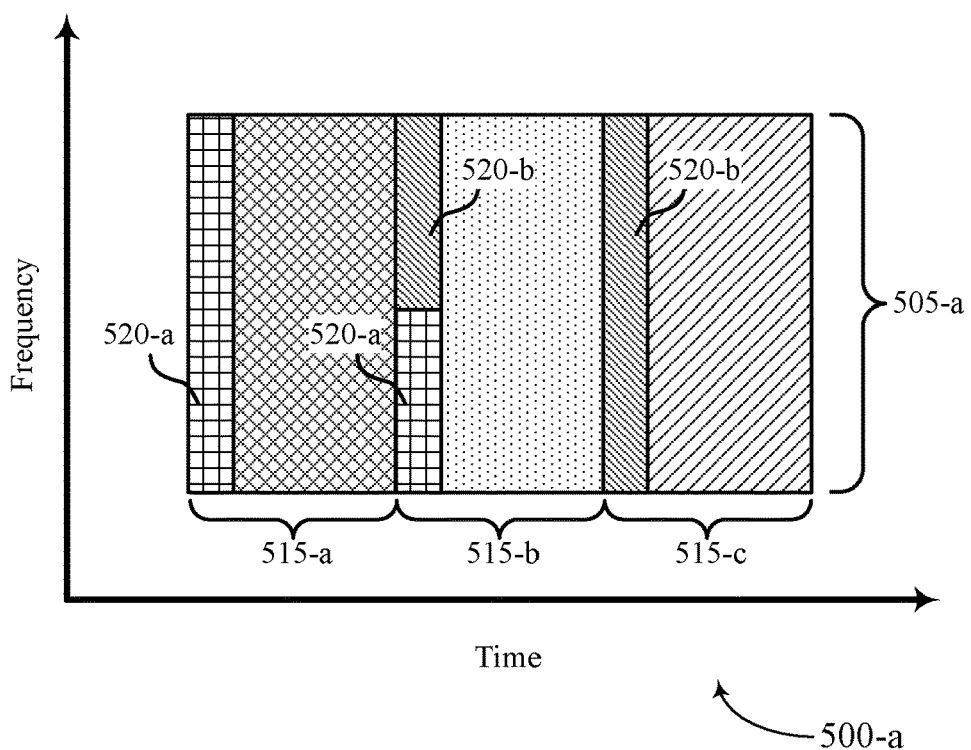
FIGS. 5A and 5B illustrate examples of control channel configurations for cell level isolation for network slicing and network sharing in accordance with one or more aspects of the present disclosure.
Figure 5B:
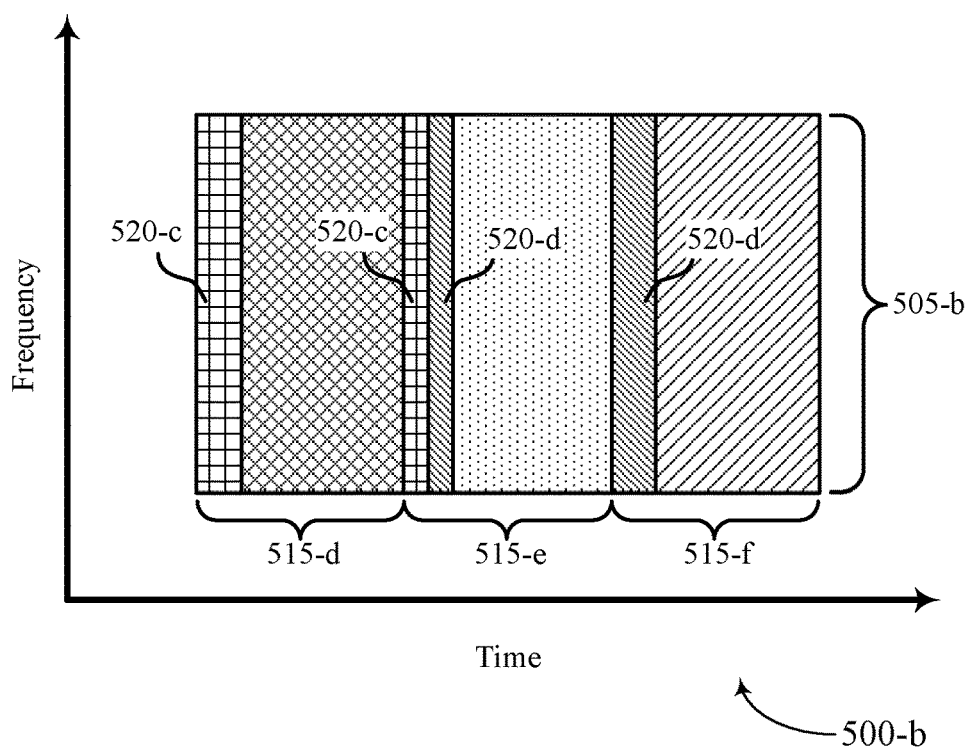

FIGS. 5A and 5B illustrate examples of control channel configurations 500 for cell level isolation for network slicing and network sharing in accordance with one or more aspects of the present disclosure. In FIG. 5A or 5B, control channel configurations 500 may be assigned by a network node such as a base station, and may be conveyed semi-statically (e.g., via an RRC message) or dynamically (e.g., based on cell load or network traffic) and may be transmitted in DCI within a PDCCH (e.g., providing an allocation for the next frame).

In FIG. 5A, a control channel configuration 500-a shows resources allocated for multiple slices multiplexed according to a TDM scheme. Carrier 505-a is configured into multiple slices, which may be assigned for use by one or more cells. In this example, a first slice 515-a is allocated for cell 1, a second slice 515-b is allocated as a shared subframe for cells 1 and 2, and a third slice 515-c is allocated for cell 2. In some examples, the multiple cells may be allocated resources based on a number of virtual networks, operators, base stations, or PLMNs sharing the carrier, or based on a number of served UEs. For example, cells 1 and 2 may be associated with different PLMNs and therefore access may be controlled via different authentication servers, in some cases.

In some examples, a portion of slices 515 may be allocated for control regions 520 over which a UE may monitor one or more control channels (e.g., a PDCCH). In this example, a control region 520-a for cell 1 a is allocated all of carrier 505-a for one or more symbols at the beginning of slice 515-a. As slice 515-b is allocated as a shared subframe for cells 1 and 2, a portion of slice 515-b is allocated for a control region 520-a for cell 1 and a control region 520-b for cell 2. In this instance, the frequency resources (e.g., sub-carriers) of carrier 505-a are divided into a control region 520-a for cell 1 and a control region 520-b for cell 2. Further, as slice 515-c is allocated for cell 2, a portion of slice 515-c may be allocated as a control region 520-b for cell 2.

A UE may be configured to communicate via cell 1 or cell 2 and may monitor control regions 520 and slices 515 allocated for cell 1 or cell 2. For example, if a UE is configured to communicate via cell 1, the UE may monitor control region 520-a of slice 515-a as well as control region 520-a of slice 515-b in order to determine whether data may be available for communication. The UE may then skip monitoring of slice 515-c as well as the control region 520-b in slice 515-b. Frequency distributed control regions may be benefit from frequency diversity and may help address power spectral density (PSD) limitations, if any. FDM of a control channel into regions may also be performed by allocating control regions according to control channel elements (CCEs). For example, the control region 520-a of slice 515-b may include a first set of CCEs while the control region 520-b of slice 515-b may include a second set of CCEs. The first and second sets of CCEs may each be contiguous, or one or more may be non-contiguous, in some cases. For example, cell 1 may be allocated odd CCEs while cell 2 is allocated even CCEs, or cell 1 and cell 2 may be allocated CCEs in blocks of 2, 4, 8, 16, and the like.

In FIG. 5B, a frequency vs. time plot is shown having resources allocated for multiple slices multiplexed according to a TDM scheme. Carrier 505-b is configured into multiple slices, which may be assigned for use by one or more cells. In this example, a first slice 515-d is allocated for cell 1, a second slice 515-e is allocated as a shared subframe for cells 1 and 2, and a third slice 515-f is allocated for cell 2. In some examples, the multiple cells may be allocated resources based on a number of virtual networks, operators, base stations, or PLMNs sharing the carrier, or a number of served UEs.

In some examples, a portion of subframes 515 may be allocated for control regions 520 over which a UE may monitor one or more control channels (e.g., a PDCCH). In this example, a control region 520-c for cell 1 a is allocated all of carrier 505-b and one or more symbols at the beginning of slice 515-d. As slice 515-e is allocated as a shared subframe for cells 1 and 2, a portion of slice 515-b is allocated for a control region 520-c for cell 1 and a control region 520-d for cell 2. In this instance, control region 520-c is allocated all of carrier 505-b for one or more symbols while control region 520-d is allocated all of carrier 505-b for one or more symbols. Here, control regions 520-c and 520-d in slice 515-e span the same number of symbols as control region 520-c in slice 515-d. However, in other cases the combined control region for control regions 520-c and 520-d may span a different number of symbols. Further, as slice 515-f is allocated for cell 2, a portion of slice 515-f may be allocated as a control region 520-d for cell 2.

A UE may be configured to communicate via cell 1 or cell 2 and may monitor control regions 520 and slices 515 allocated for cell 1 or cell 2. For example, if a UE is configured to communicate via cell 2, the UE may monitor control region 520-d of slice 515-e as well as control region 520-d of slice 515-f in order to determine whether data may be available for communication. The UE may then skip monitoring of slice 515-d as well as the control region 520-c in slice 515-e.

In some examples, a UE may be configured to monitor control regions for more than one cell (e.g., cells may be aggregated for some UEs). Where a UE is configured for communication via more than one cell, radio bearer level isolation may be supported (e.g., radio bearers may be isolated to particular cells). For example, data associated with a first radio bearer configured for a UE may be communicated via cell 1 only, while data associated with a second radio bearer configured for the UE may be communicated via cell 2 only.

Figure 6:
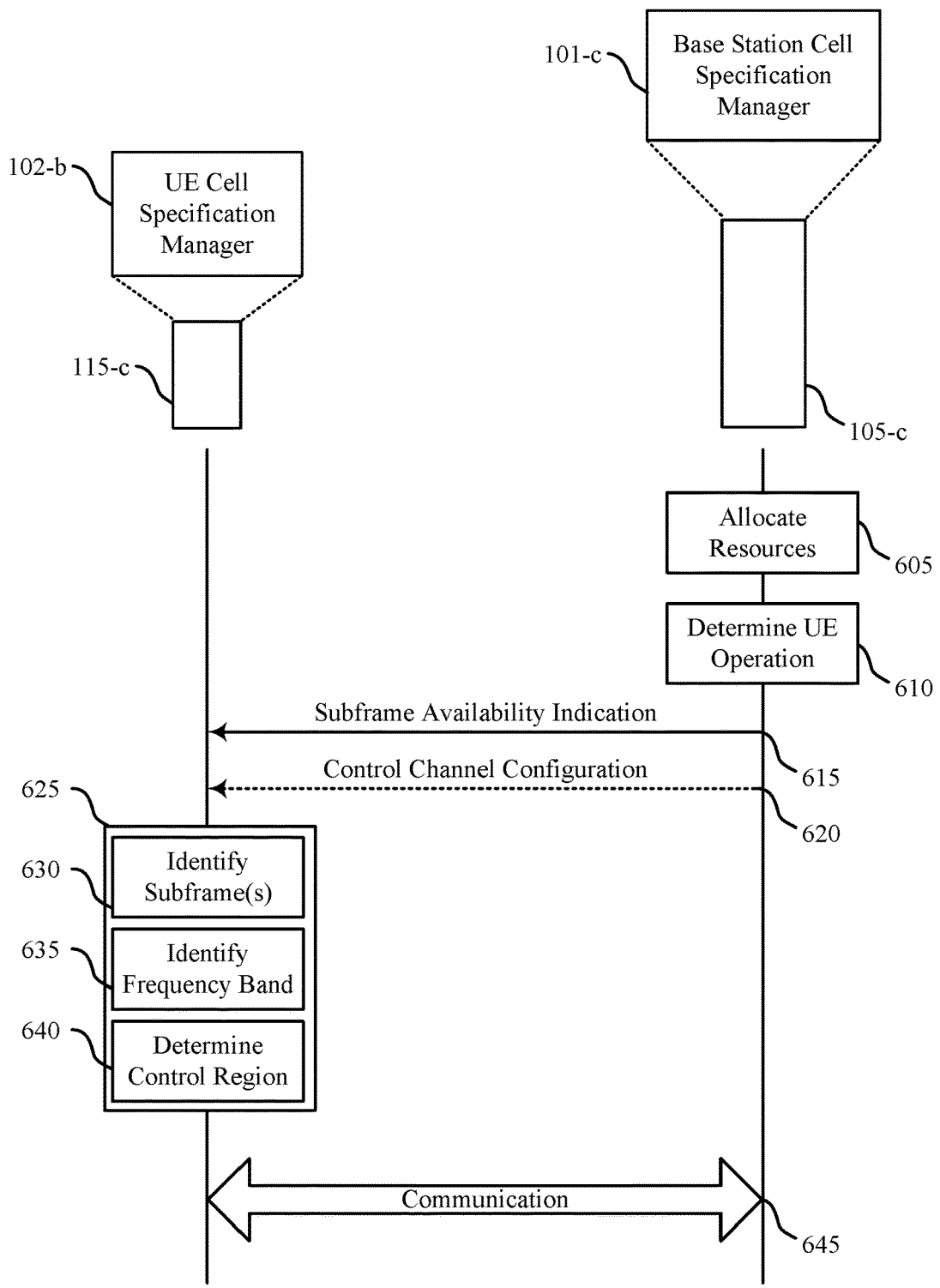
FIG. 6 illustrates an example of a process flow that supports cell level isolation for network slicing and network sharing in accordance with one or more aspects of the present disclosure.

FIG. 6 illustrates an example of a process flow 600 for cell level isolation for network slicing and network sharing in accordance with one or more aspects of the present disclosure. Process flow 600 includes a base station 105-c in communication with a UE 115-c. The base station 105-c includes a base station cell specification manager 101-c and the UE 115-c includes a UE cell specification manager 102-b.

At 605, base station 105-c allocates resources of a carrier for multiple slices, which may be assigned to one or more cells. Resources for the multiple slices may be allocated according to a TDM scheme and may be allocated using the base station cell specification manager 101-c. For example, a first slice may correspond to a first subset of time resources (e.g., subframes) of the carrier, which may be configured for independent use by a first cell. A second slice may correspond to a second subset of the time resources of the carrier, which may be configured for independent use by a second cell. In some aspects, common subframes may be allocated for use by multiple cells. For instance, the base station 105-c may configure a shared subframe for communication for both a first cell and a second cell. The base station 105-c may also allocate dedicated resources (e.g., subframes) for a given cell. For example, the base station 105-c may configure a subframe for communication for a first cell and a different subframe for communication for a second cell. In some examples, the base station 105-c may communicate via one of the cells while a different base station communicates via the other cell. Alternatively, a single base station 105-c may communicate via both cells. The first cell and second cell may use the same or different RATs.

At 610, base station 105-c determines an operation of UE 115-c. For example, the base station 105-c may determine that the UE 115-c is operating according to one or both of the first cell or the second cell. In some cases, the base station 105-c may determine the cell association for the UE 115-c based on an ID of the UE, a portion of the carrier used for random access, a random access sequence, and the like. For example, the UE 115-c may identify subframes for a cell associated with its Home PLMN (HPLMN), and perform a random access on corresponding subframes of the cell. Based on the determination, the base station 105-c may transmit a subframe availability indication to the UE 115-c at 615. The subframe availability indication may include information related to the resources allocated at 605. For example, the subframe availability indication may include a set of resources allocated for the first cell and the second cell. The set of resources may include one or more shared subframes. In some cases, the subframe availability indication may be broadcast by each cell in SI or may be transmitted using any physical channel (e.g., within a MAC control element (CE) or DCI, etc.). The subframe availability indication may also include subframe partition information such as the subframe partition schemes 300 as described with respect to FIGS. 3A-3C. The subframe availability indication may include separate subframe partition information for a DL carrier and an UL carrier, or may include one set of subframe partition information used for DL and UL carriers. The subframe availability indication may also indicate subframe partition information for a TDD carrier.

At 620, the base station 105-c may transmit a control channel configuration to UE 115-c. The control channel configuration may include information related to one or more control regions associated with multiple subframes. The control channel configuration may be determined by a core network node and transmitted to the base station 105-c (e.g., using a backhaul link).

At 625, the UE 115-c may determine or identify a set of resources for communication with the base station 105-c. The resource identification may include identifying subframes associated with one of the first cell or the second cell at 630. The subframes may include dedicated subframes or shared subframes and the UE may identify one or more subframes to monitor depending on whether the UE is associated with a first cell, a second cell, or both.

At 635, the UE 115-c may also determine a CC for communication with the base station 105-c. The CC may be a common CC shared between multiple cells or a portion of a system CC may be associated with multiple cells.

At 640, the UE 115-c may determine control regions for one or more control channels. Each cell may have corresponding control regions and if one or more shared subframes are identified at 630, multiple control regions may be allocated in the shared subframes for each of the multiple cells allocated to the shared subframe. After determining the control regions, the UE 115-c may synchronize and connect to the base station 105-c to perform communication at 645 using the resources determined in 525.

Figure 7:
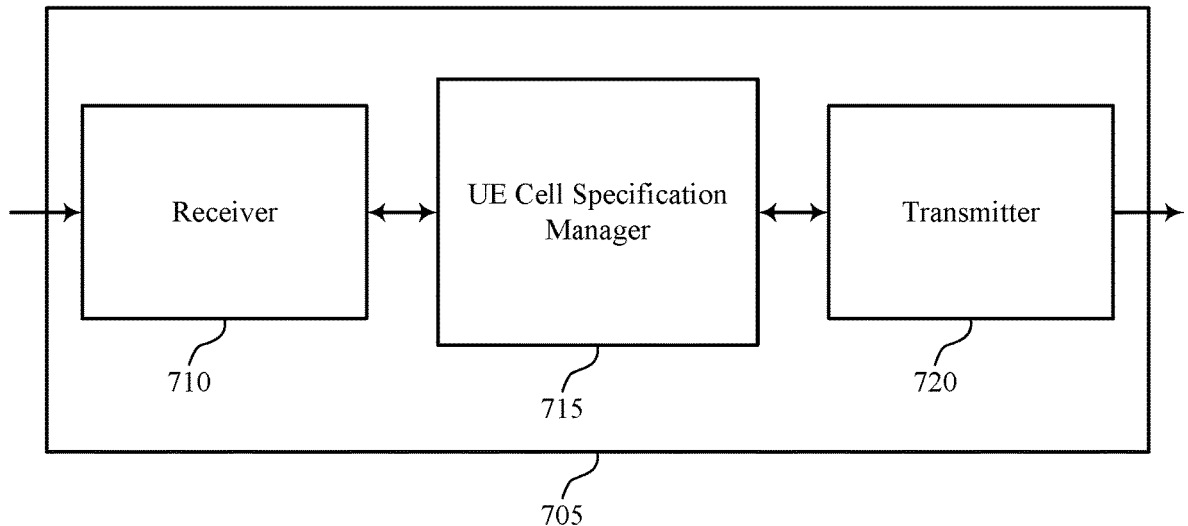
FIGS. 7 through 9 show block diagrams of a device that supports cell level isolation for network slicing and network sharing in accordance with one or more aspects of the present disclosure.

FIG. 7 shows a block diagram 700 of a wireless device 705 that supports cell level isolation for network slicing and network sharing in accordance with one or more aspects of the present disclosure. Wireless device 705 may be an example of aspects of a UE 115 as described with reference to FIGS. 1, 2, and 6. Wireless device 705 may include receiver 710, UE cell specification manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to cell level isolation for network slicing and network sharing, etc.). Information may be passed on to other components of the device. The receiver 710 may be an example of aspects of the transceiver 1035 described with reference to FIG. 10.

UE cell specification manager 715 may receive a subframe availability indication from a base station associated with at least one of a first cell and a second cell, the subframe availability indication indicating a set of time resources for a set of cells including the first cell and the second cell, where the set of time resources include at least one of a first set of independent time resources for the first cell and a second set of independent time resources for the second cell. UE cell specification manager 715 may identify a subframe within the set of time resources for communication with the base station based on the subframe availability indication, where the identified subframe is associated with at least one of the first cell and the second cell. UE cell specification manager 715 may communicate with the base station during the subframe based on the identifying. UE cell specification manager 715 may be an example of aspects of the UE cell specification manager 1015 described with reference to FIG. 10.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or may include a set of antennas.

Figure 8:
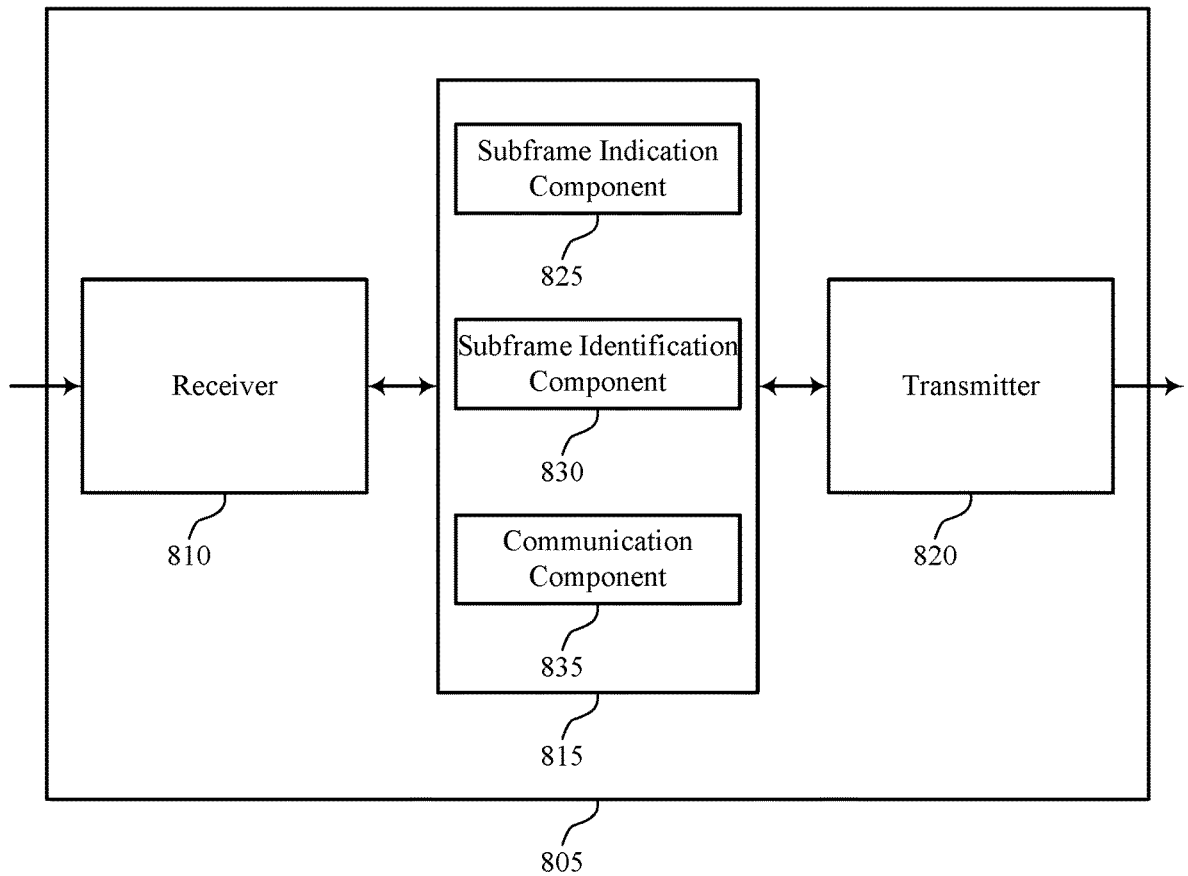

FIG. 8 shows a block diagram 800 of a wireless device 805 that supports cell level isolation for network slicing and network sharing in accordance with one or more aspects of the present disclosure. Wireless device 805 may be an example of aspects of a wireless device 705 or a UE 115 as described with reference to FIGS. 1, 2, 6, and 7. Wireless device 805 may include receiver 810, UE cell specification manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to cell level isolation for network slicing and network sharing, etc.). Information may be passed on to other components of the device. The receiver 810 may be an example of aspects of the transceiver 1035 described with reference to FIG. 10.

UE cell specification manager 815 may be an example of aspects of the UE cell specification manager 1015 described with reference to FIG. 10. UE cell specification manager 815 may also include subframe indication component 825, subframe identification component 830, and communication component 835.

Subframe indication component 825 may receive a subframe availability indication from a base station associated with at least one of a first cell and a second cell, the subframe availability indication indicating a set of time resources for a set of cells including the first cell and the second cell, where the set of time resources comprises at least one of a first set of independent time resources for the first cell and a second set of independent time resources for the second cell. In some cases, the subframe availability indication indicates that at least a portion of the set of time resources is shared between the first cell and the second cell. In some aspects, the subframe availability indication indicates that at least a portion of the set of time resources is shared between each of the set of cells. In some examples, the subframe availability indication indicates a number of subframes associated with the first cell. In some instances, at least one of a DRX timer or a HARQ timer for the first cell is based on the number of subframes associated with the first cell. In some cases, the subframe availability indication is received via system information, an RRC channel, or a physical channel.

Subframe identification component 830 may identify a subframe within the set of time resources for communication with the base station based on the subframe availability indication, where the identified subframe is associated with at least one of the first cell and the second cell and determine an additional subframe for communication with the base station based on the subframe availability indication, the additional subframe associated with one of the first cell or the second cell. In some cases, identifying the subframe within the set of time resources includes identifying a common subframe shared between the first cell and the second cell based on the subframe availability indication.

Communication component 835 may communicate with the base station during the subframe based on the identifying. In some cases, communicating with the base station during the subframe includes communicating with the base station using an identified common CC. In some examples, communicating with the base station during the subframe includes communicating with the base station during an identified common subframe.

Transmitter 820 may transmit signals generated by other components of the device. In some cases, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
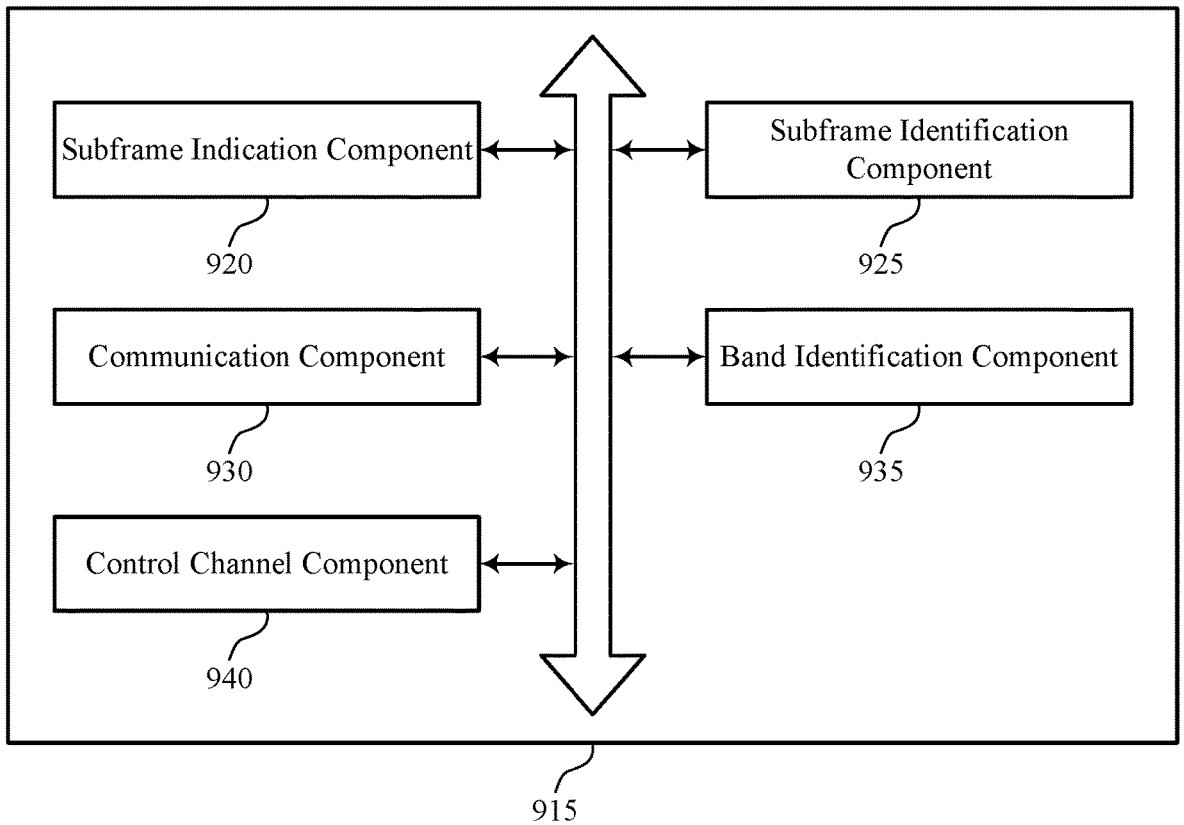

FIG. 9 shows a block diagram 900 of a UE cell specification manager 915 that supports cell level isolation for network slicing and network sharing in accordance with one or more aspects of the present disclosure. The UE cell specification manager 915 may be an example of aspects of a UE cell specification manager 715, a UE cell specification manager 815, or a UE cell specification manager 1015 described with reference to FIGS. 7, 8, and 10. The UE cell specification manager 915 may include subframe indication component 920, subframe identification component 925, communication component 930, band identification component 935, and control channel component 940. Each of these modules may communicate, directly or indirectly, with one another (e.g., via one or more buses).

Subframe indication component 920 may receive a subframe availability indication from a base station associated with at least one of a first cell and a second cell, the subframe availability indication indicating a set of time resources for a set of cells including the first cell and the second cell, where the set of time resources includes at least one of a first set of independent time resources for the first cell and a second set of independent time resources for the second cell. In some cases, the subframe availability indication indicates that at least a portion of the set of time resources is shared between the first cell and the second cell. In some aspects, the subframe availability indication indicates that at least a portion of the set of time resources is shared between each of the set of cells. In some examples, the subframe availability indication indicates a number of subframes associated with the first cell. In some instance, at least one of a DRX timer or a HARQ timer for the first cell is based on the number of subframes associated with the first cell. In some cases, the subframe availability indication is received via system information, an RRC channel, or a physical channel.

Subframe identification component 925 may identify a subframe within the set of time resources for communication with the base station based on the subframe availability indication, the identified subframe associated with at least one of the first cell and the second cell and determine an additional subframe for communication with the base station based on the subframe availability indication, the additional subframe associated with one of the first cell or the second cell. In some cases, identifying the subframe within the set of time resources includes identifying a common subframe shared between the first cell and the second cell based on the subframe availability indication.

Communication component 930 may communicate with the base station during the subframe based on the identifying. In some cases, communicating with the base station during the subframe includes communicating with the base station via the configured carrier. In some cases, communicating with the base station during the subframe includes communicating with the base station during the identified common subframe.

Band identification component 935 may identify a common carrier shared between the first cell and the second cell based on the subframe availability indication.

Control channel component 940 may receive a control channel configuration from the base station, the control channel configuration indicating a first control region for the first cell or a second control region for the second cell and determine a shared control region for the first cell and the second cell based on the received control channel configuration. Control channel component 940 may monitor a first control region for the first cell and a second control region for the second cell. In some examples, the control channel component 940 may determine a first radio bearer based on monitoring the first control region and a second radio bearer based on monitoring the second control region. The control channel component 940 may communicate with a base station supporting the first cell using the determined first radio bearer. The control channel component 940 may communicate with a base station supporting the second cell using the determined second radio bearer. In some cases, the first radio bearer and the second radio bearer may be different.

Figure 10:
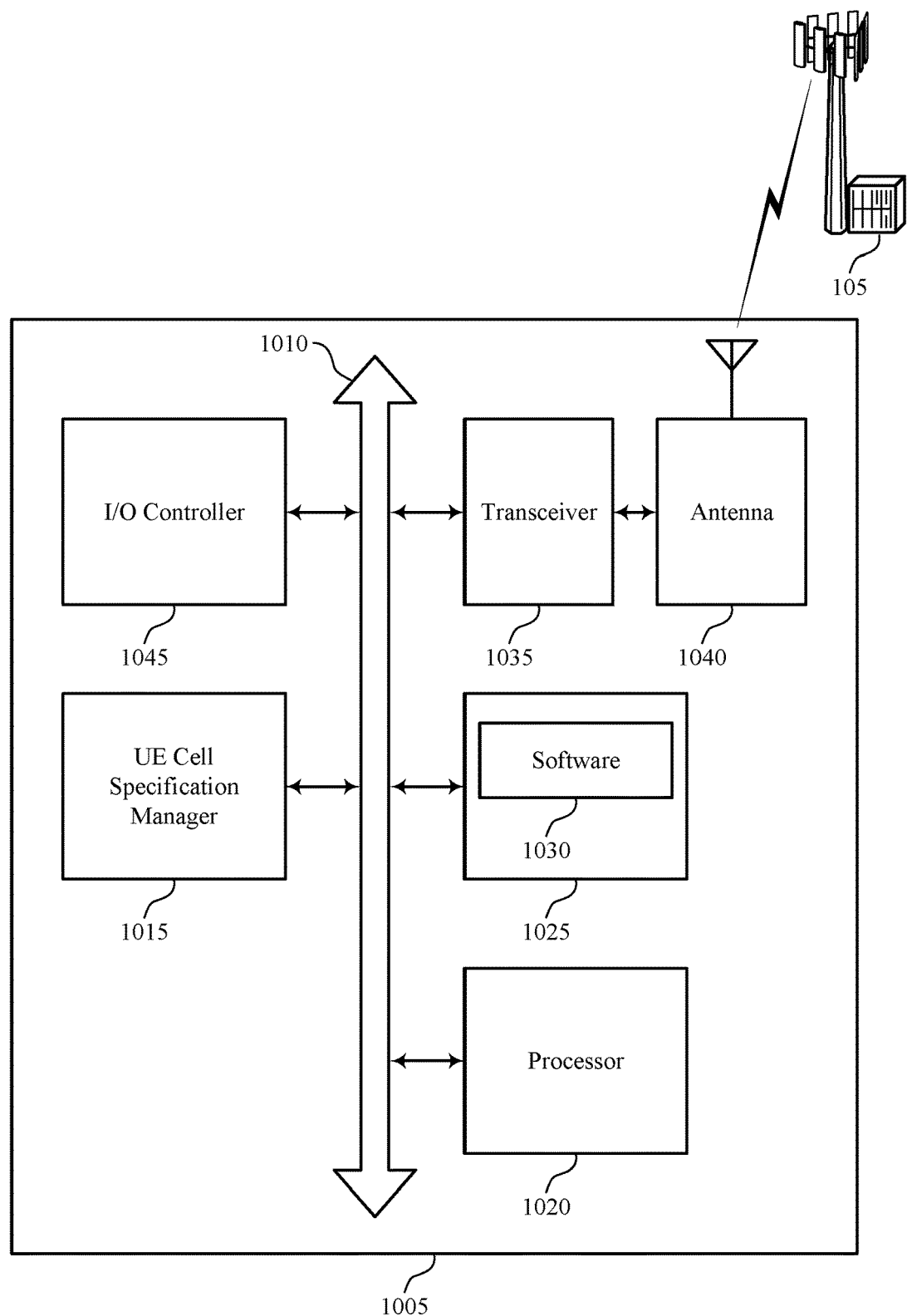
FIG. 10 illustrates a block diagram of a system including a UE that supports cell level isolation for network slicing and network sharing in accordance with one or more aspects of the present disclosure.

FIG. 10 shows a diagram of a system 1000 including a device 1005 that supports cell level isolation for network slicing and network sharing in accordance with one or more aspects of the present disclosure. Device 1005 may be an example of or include the components of wireless device 705, wireless device 805, wireless device 905, or a UE 115 as described above, e.g., with reference to FIGS. 1, 2, and 6-9. Device 1005 may include components for bi-directional voice and data communications including components for transmitting and receiving communications, including UE cell specification manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting cell level isolation for network slicing and network sharing), 1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support cell level isolation for network slicing and network sharing. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
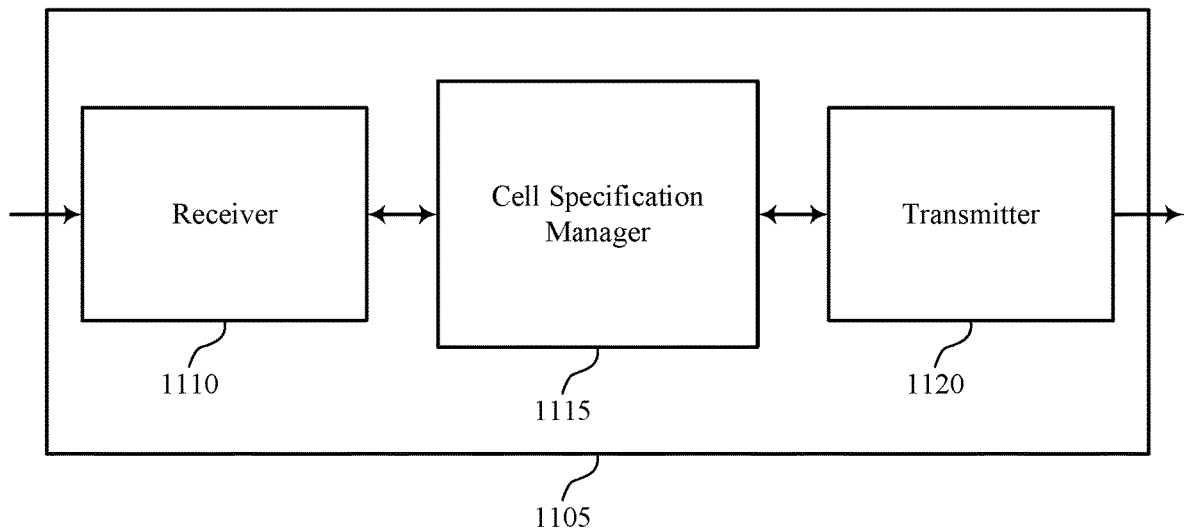
FIGS. 11 through 13 show block diagrams of a device that supports cell level isolation for network slicing and network sharing in accordance with one or more aspects of the present disclosure.

FIG. 11 shows a block diagram 1100 of a wireless device 1105 that supports cell level isolation for network slicing and network sharing in accordance with one or more aspects of the present disclosure. Wireless device 1105 may be an example of aspects of a base station 105 as described with reference to FIGS. 1, 2, and 6. Wireless device 1105 may include receiver 1110, cell specification manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to cell level isolation for network slicing and network sharing, etc.). Information may be passed on to other components of the device. The receiver 1110 may be an example of aspects of the transceiver 1435 described with reference to FIG. 14.

Cell specification manager 1115 may configure a first subset of a set of time resources of a carrier as independent time resources for a first network slice and configure a second subset of the set of time resources as independent time resources for a second network slice. Cell specification manager 1115 may assign the first network slice to a first cell of a plurality of cells and the second network slice to a second cell of the plurality of cells and may determine whether a UE is operating in one or both of the first cell or the second cell. Cell specification manager 1115 may identify a subframe of the set of time resources for communication with the UE based on the determining and communicate with the UE during the identified subframe using at least a portion of the set of time resources. Cell specification manager 1115 may be an example of aspects of the cell specification manager 1415 described with reference to FIG. 14.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
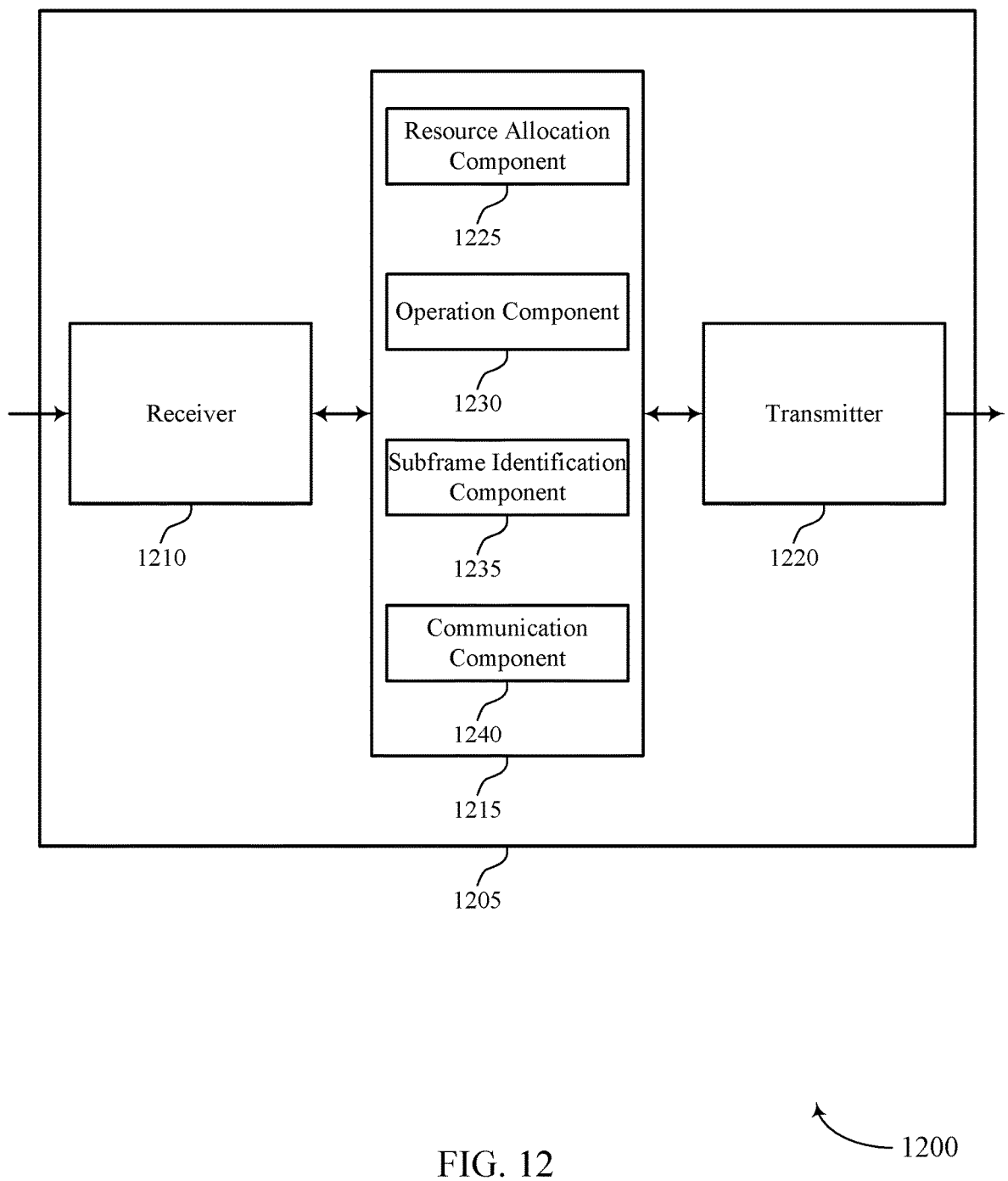

FIG. 12 shows a block diagram 1200 of a wireless device 1205 that supports cell level isolation for network slicing and network sharing in accordance with one or more aspects of the present disclosure. Wireless device 1205 may be an example of aspects of a wireless device 1105 or base station 105 as described with reference to FIGS. 1, 2, 6, and 11. Wireless device 1205 may include receiver 1210, cell specification manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to cell level isolation for network slicing and network sharing, etc.). Information may be passed on to other components of the device. The receiver 1210 may be an example of aspects of the transceiver 1435 described with reference to FIG. 14.

Cell specification manager 1215 may be an example of aspects of the cell specification manager 1415 described with reference to FIG. 14. Cell specification manager 1215 may also include resource allocation component 1225, operation component 1230, subframe identification component 1235, and communication component 1240.

Resource allocation component 1225 may configure a first subset of a set of time resources of a carrier as independent time resources for a first network slice and configure a second subset of the set of time resources as independent time resources for a second network slice. In some cases, configuring the first subset of the set of time resources includes scheduling a shared subframe for downlink or uplink communication for the first cell and configuring the second subset of the set of time resources includes scheduling the shared subframe for downlink or uplink communication for the second cell. In some aspects, resource allocation component 1225 may schedule a shared subframe for downlink or uplink communication for each of the set of cells. In some instances, the first cell is associated with a first PLMN and the second cell is associated with a second PLMN different from the first PLMN.

Resource allocation component 1225 may receive, from a UE configured for operating using the first cell, a request for communication via the second network slice. Resource allocation component 1225 may configure the UE for communication via the second cell. The second cell may be configured as a secondary cell for the UE (e.g., using carrier aggregation) or as a second primary cell for the UE (e.g., in a dual-connectivity mode). Resource allocation component 1225 may configure a third subset of the set of time resources as independent time resources for a third network slice and assign the third network slice to the first cell. Resource allocation component 1225 may identify a handover of the UE from the first cell to a third cell and determine that the third cell excludes support for one of the first network slice or the second network slice. Resource allocation component 1225 may configure the UE for communication via the third cell and a fourth cell, the fourth cell associated with a fourth network slice corresponding to the one of the first network slice or the second network slice. The fourth cell may be configured as a secondary cell for the UE (e.g., using carrier aggregation) or as a second primary cell for the UE (e.g., in a dual-connectivity mode).

Resource allocation component 1225 may configure a third subset of the set of time resources as shared time resources of the first cell and the second cell, identify a first control region within one or more subframes of the third subset of the set of time resources, the first control region allocated for control information associated with the first cell, and identify a second control region in the first one or more subframes of the third subset of the set of time resource, the second control region allocated for control information associated with the second cell. In some cases, the first control region may include a first set of symbol periods of the one or more subframes, and the second control region may include a second set of symbol periods of the one or more subframes, the second set of symbol periods non-overlapping with the first set of symbol periods. In some cases, the first control region may include a first set of sub-carriers and the second control region may include a second set of sub-carriers, the second set of sub-carriers non-overlapping with the first set of sub-carriers. In some examples, the first control region may include a first set of control channel elements (CCEs) in a control channel, and the second control region may include a second set of CCEs in the control channel.

Operation component 1230 may determine whether a UE is operating in one or both of the first cell or the second cell.

Subframe identification component 1235 may identify a subframe of the set of time resources for communication with the UE based on the determining.

Communication component 1240 may communicate with the UE during the identified subframe using at least a portion of the set of time resources. In some cases, communicating with the UE includes transmitting, using a first waveform, a first synchronization signal or a first broadcast channel for the first cell to the UE using a portion of the first subset of the set of time resources. In some cases, communicating with the UE includes transmitting, using a second waveform different from the first waveform, a second synchronization signal or a second broadcast channel for the second cell to the UE using a portion of the second subset of the set of time resources. In some cases, communicating with the UE includes transmitting, to the UE, a shared synchronization signal or a shared broadcast channel for the first cell and the second cell using at least a portion of the set of time resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
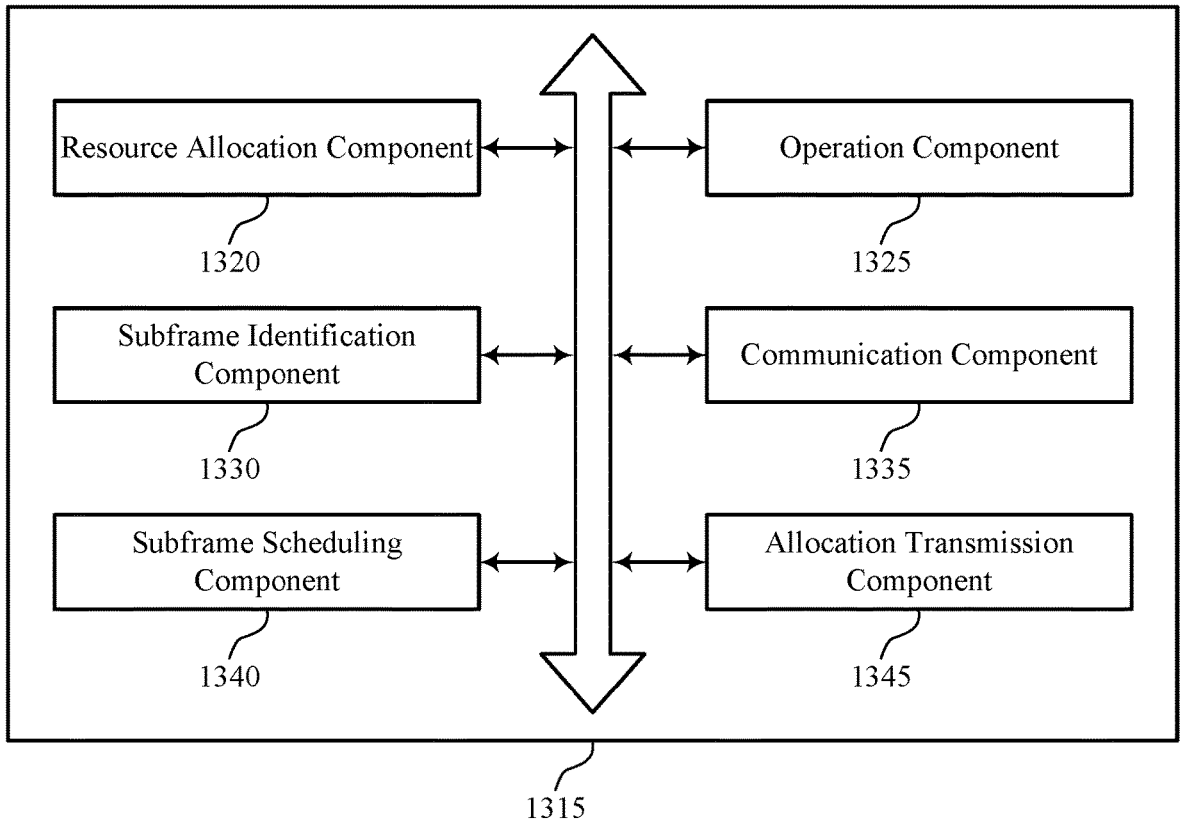

FIG. 13 shows a block diagram 1300 of a cell specification manager 1315 that supports cell level isolation for network slicing and network sharing in accordance with one or more aspects of the present disclosure. The cell specification manager 1315 may be an example of aspects of a cell specification manager 1415 described with reference to FIGS. 11, 12, and 14. The cell specification manager 1315 may include resource allocation component 1320, operation component 1325, subframe identification component 1330, communication component 1335, subframe scheduling component 1340, and allocation transmission component 1345. Each of these modules may communicate, directly or indirectly, with one another (e.g., via one or more buses).

Resource allocation component 1320 may configure a first subset of a set of time resources of a carrier as independent time resources for a first network slice and configure a second subset of the set of time resources as independent time resources for a second network slice. In some cases, configuring the first subset of the set of time resources includes scheduling a shared subframe for downlink or uplink communication for the first cell and configuring the second subset of the set of time resources includes scheduling the shared subframe for downlink or uplink communication for the second cell. In some examples, resource allocation component 1320 may schedule a shared subframe for downlink or uplink communication for each of the set of cells. In some aspects, the first cell is associated with a first PLMN and the second cell is associated with a second PLMN different from the first PLMN.

Resource allocation component 1320 may receive, from a UE configured for operating using the first cell, a request for communication via the second network slice. Resource allocation component 1320 may configure the UE for communication via the second cell. The second cell may be configured as a secondary cell for the UE or as a second primary cell for the UE. Resource allocation component 1320 may configure a third subset of the set of time resources as independent time resources for a third network slice and assign the third network slice to the first cell. Resource allocation component 1320 may identify a handover of the UE from the first cell to a third cell and determine that the third cell excludes support for one of the first network slice or the second network slice. Resource allocation component 1320 may configure the UE for communication via the third cell and a fourth cell, the fourth cell associated with a fourth network slice corresponding to the one of the first network slice or the second network slice. The fourth cell may be configured as a secondary cell for the UE or as a second primary cell for the UE.

Resource allocation component 1320 may configure a third subset of the set of time resources as shared time resources of the first cell and the second cell, identify a first control region within one or more subframes of the third subset of the set of time resources, the first control region allocated for control information associated with the first cell, and identify a second control region in the first one or more subframes of the third subset of the set of time resource, the second control region allocated for control information associated with the second cell. In some cases, the first control region may include a first set of symbol periods of the one or more subframes, and the second control region may include a second set of symbol periods of the one or more subframes, the second set of symbol periods non-overlapping with the first set of symbol periods. In some cases, the first control region may include a first set of sub-carriers and the second control region may include a second set of sub-carriers, the second set of sub-carriers non-overlapping with the first set of sub-carriers. In some examples, the first control region may include a first set of CCEs in a control channel, and the second control region may include a second set of CCEs in the control channel.

Operation component 1325 may determine whether a UE is operating in one or both of the first cell or the second cell.

Subframe identification component 1330 may identify a subframe of the set of time resources for communication with the UE based on the determining.

Communication component 1335 may communicate with the UE during the identified subframe using at least a portion of the allocated set of resources. In some cases, communicating with the UE includes transmitting, using a first waveform, a first synchronization signal or a first broadcast channel for the first cell to the UE using a portion of the first subset of the set of time resources. In some cases, communicating with the UE includes transmitting, using a second waveform different from the first waveform, a second synchronization signal or a second broadcast channel for the second cell to the UE using a portion of the second subset of the set of time resources. In some cases, communicating with the UE includes transmitting, to the UE, a shared synchronization signal or a shared broadcast channel for the first cell and the second cell using at least a portion of the set of time resources.

Subframe scheduling component 1340 may schedule a first subframe for downlink or uplink communication for the first cell and schedule a second subframe downlink or uplink communication for the second cell, where the first subframe is different from the second subframe.

Allocation transmission component 1345 may transmit a subframe availability indication to the UE, the subframe availability indication indicating subframe partition information of the first cell and the second cell and determine at least one of a DRX timer or a HARQ timer for the first cell based on a number of subframes configured for the first cell.

In some cases, the subframe availability indication is transmitted via system information, an RRC channel, or a physical channel.

Figure 14:
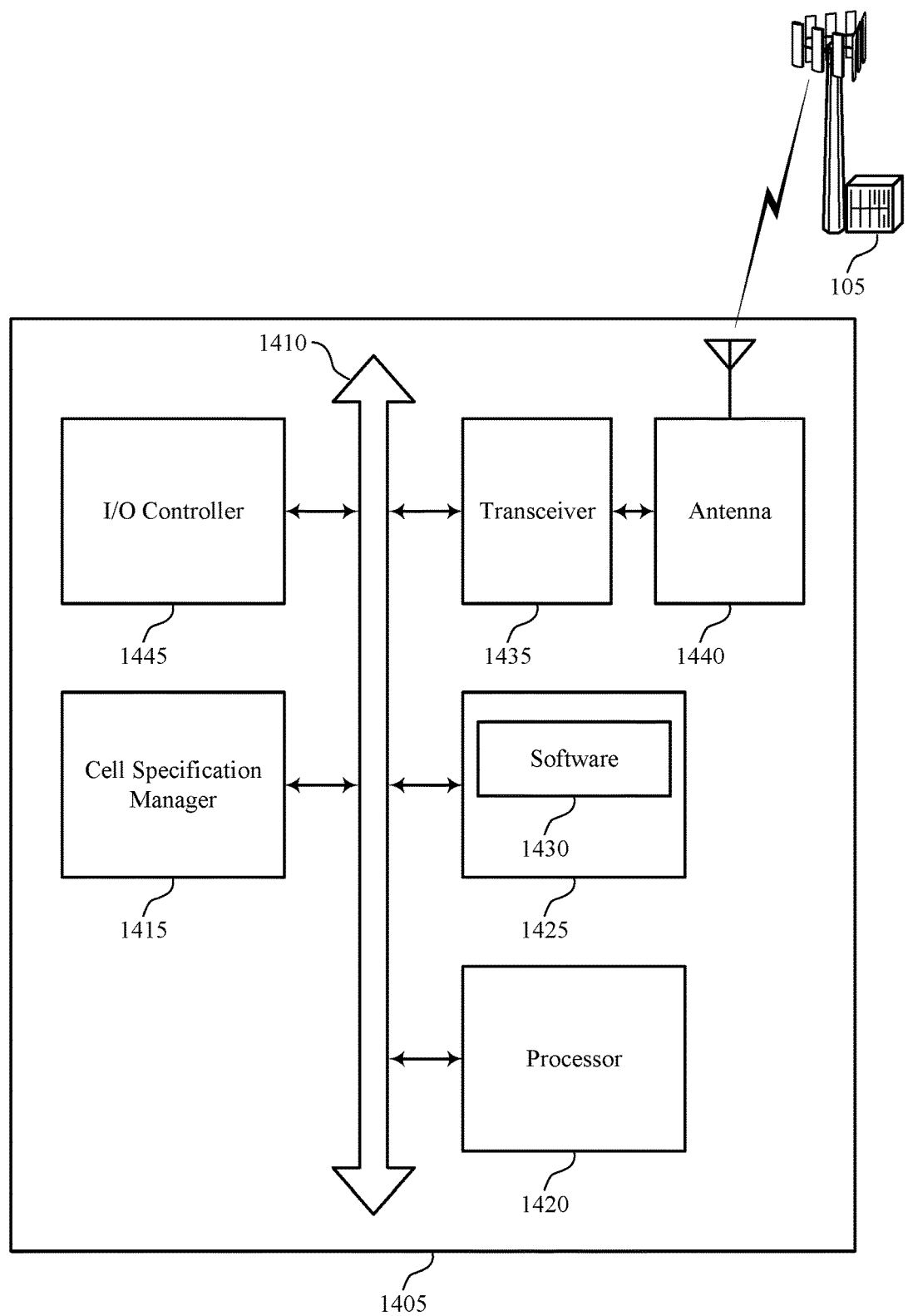
FIG. 14 illustrates a block diagram of a system including a device that supports cell level isolation for network slicing and network sharing in accordance with one or more aspects of the present disclosure.

FIG. 14 shows a diagram of a system 1400 including a device 1405 that supports cell level isolation for network slicing and network sharing in accordance with one or more aspects of the present disclosure. Device 1405 may be an example of or include the components of base station 105 as described above, e.g., with reference to FIGS. 1, 2, 6, and 11-13. Device 1405 may include components for bi-directional voice and data communications including components for transmitting and receiving communications, including cell specification manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting cell level isolation for network slicing and network sharing), 1420.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support cell level isolation for network slicing and network sharing. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
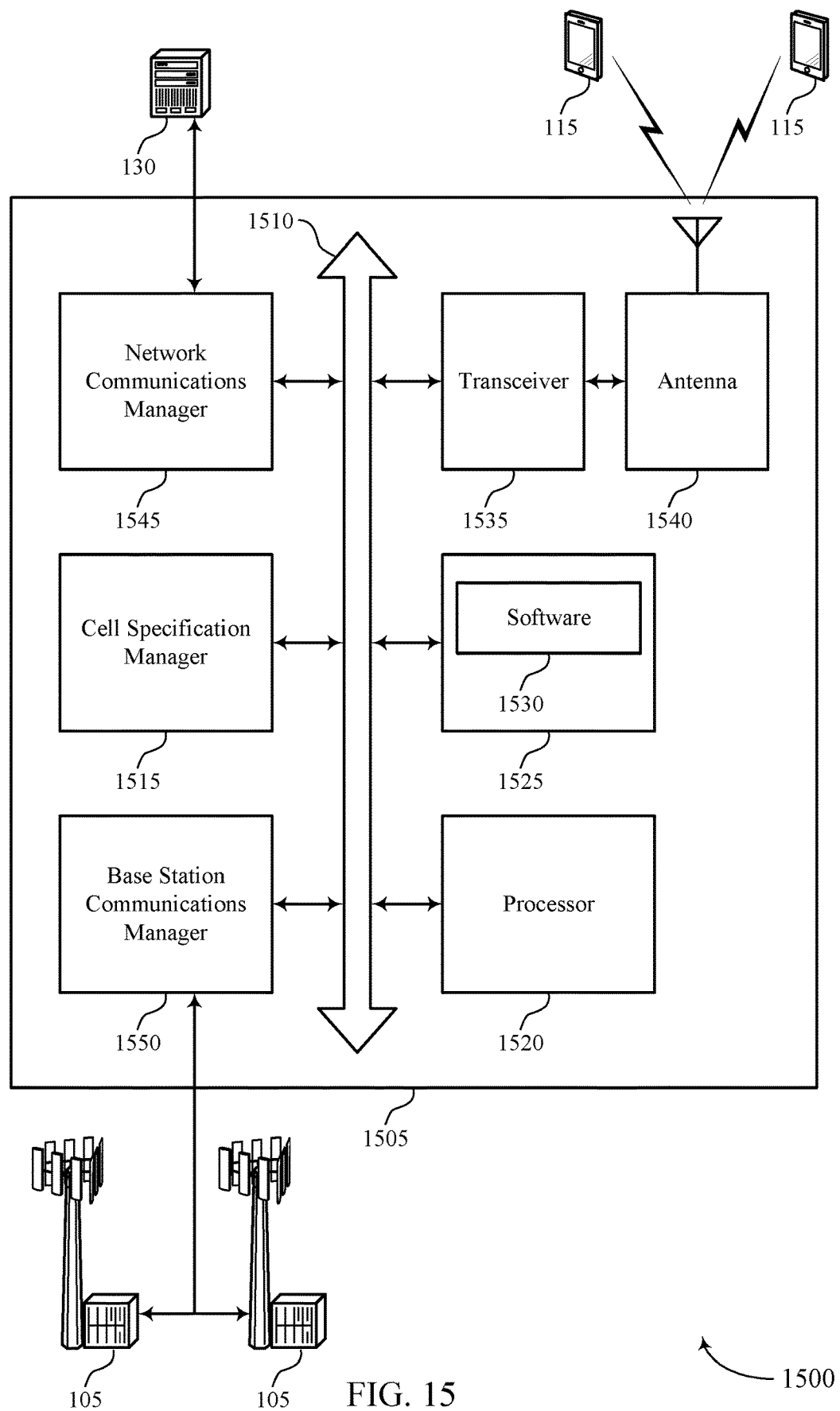
FIG. 15 illustrates a block diagram of a system including a device that supports cell level isolation for network slicing and network sharing in accordance with one or more aspects of the present disclosure.

FIG. 15 shows a diagram of a system 1500 including a device 1505 that supports cell level isolation for network slicing and network sharing in accordance with one or more aspects of the present disclosure. Device 1505 may be an example of or include the components of base station 105 as described above, e.g., with reference to FIG. 1. Device 1505 may include components for bi-directional voice and data communications including components for transmitting and receiving communications, including base station cell specification manager 1515, processor 1520, memory 1525, software 1530, transceiver 1535, antenna 1540, network communications manager 1545, and base station communications manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting cell level isolation for network slicing and network sharing), 1520.

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support cell level isolation for network slicing and network sharing. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station communications manager 1550 may manage communications with other base station 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide an X2 interface within an LTE/LTE-A wireless communication network technology to provide communication between base stations 105.

Figure 16:
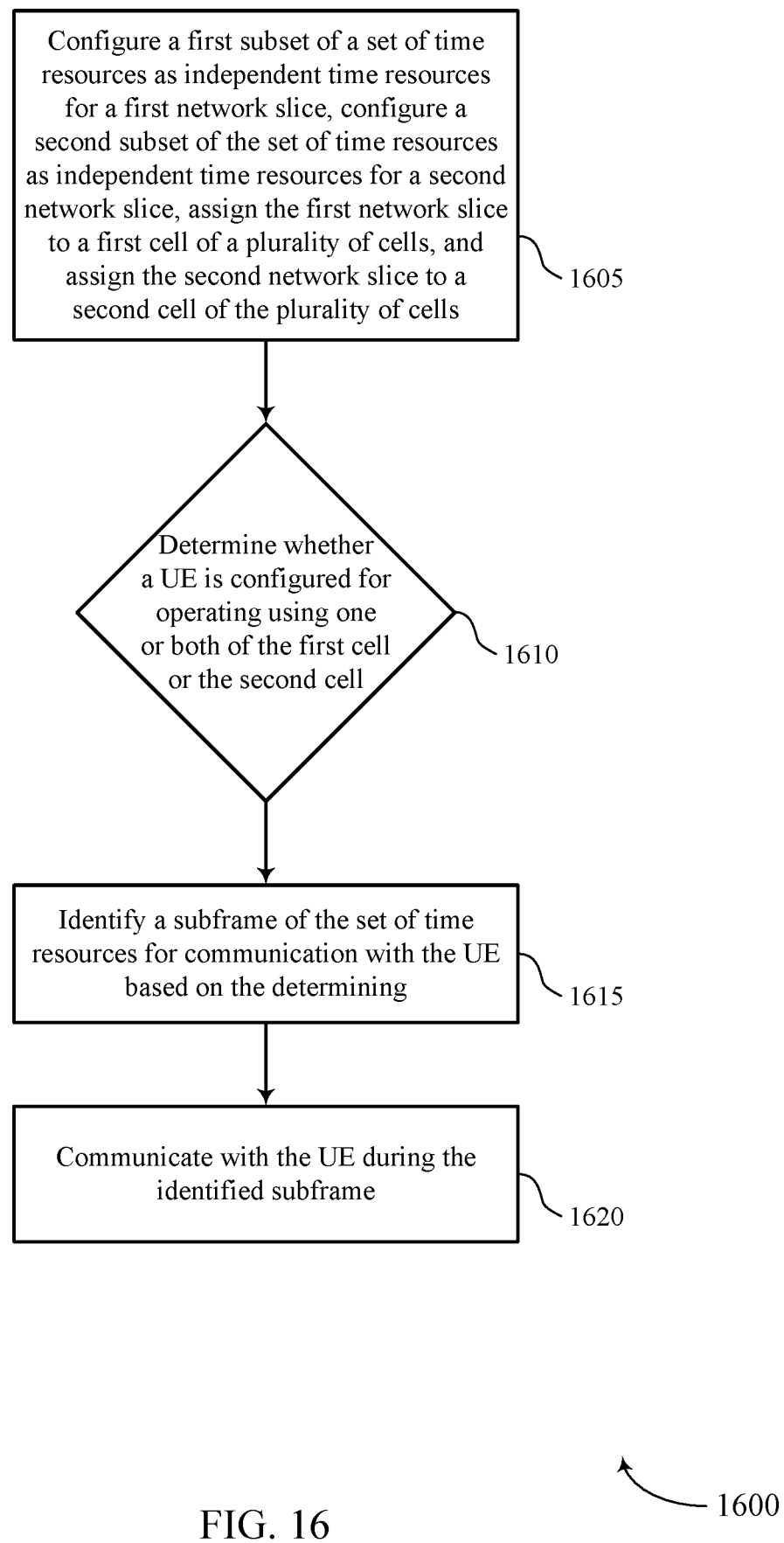
FIGS. 16 through 18 illustrate methods for cell level isolation for network slicing and network sharing in accordance with one or more aspects of the present disclosure.

FIG. 16 shows a flowchart illustrating a method 1600 for cell level isolation for network slicing and network sharing in accordance with one or more aspects of the present disclosure. The operations of method 1600 may be implemented by a base station 105 or its components as described herein. For example, the operations of method 1600 may be performed by a cell specification manager as described with reference to FIGS. 11 through 15. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may configure a first subset of a set of time resources of a carrier as independent time resources for a first network slice and configure a second subset of the set of time resources as independent time resources for a second network slice. At block 1605, the base station 105 may assign the first network slice to a first cell of a plurality of cells, and assign the second network slice to a second cell of the plurality of cells. The operations of block 1605 may be performed according to the methods described with reference to FIGS. 1 through 6. In certain examples, aspects of the operations of block 1605 may be performed by a resource allocation component as described with reference to FIGS. 11 through 13.

At block 1610, the base station 105 may determine whether a UE is configured for operating in one or both of the first cell or the second cell. The operations of block 1610 may be performed according to the methods described with reference to FIGS. 1 through 6. In certain examples, aspects of the operations of block 1610 may be performed by a operation component as described with reference to FIGS. 11 through 13.

At block 1615, the base station 105 may identify a subframe of the set of resources for communication with the UE based at least in part on the determining. The operations of block 1615 may be performed according to the methods described with reference to FIGS. 1 through 6. In certain examples, aspects of the operations of block 1615 may be performed by a subframe identification component as described with reference to FIGS. 11 through 13.

At block 1620, the base station 105 may communicate with the UE during the identified subframe using at least a portion of the set of time resources. The operations of block 1620 may be performed according to the methods described with reference to FIGS. 1 through 6. In certain examples, aspects of the operations of block 1620 may be performed by a communication component as described with reference to FIGS. 11 through 13.

Figure 17:
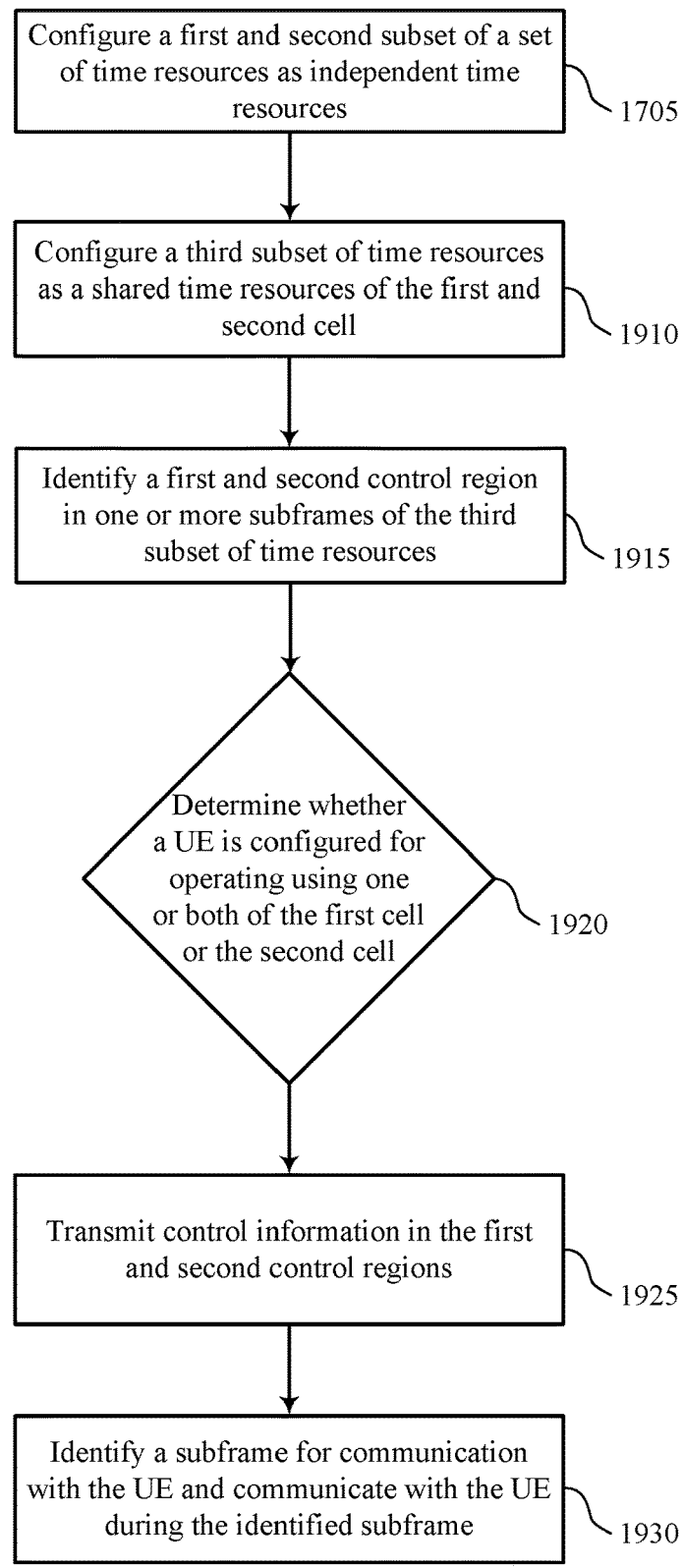

FIG. 17 shows a flowchart illustrating a method 1700 for cell level isolation for network slicing and network sharing in accordance with one or more aspects of the present disclosure. The operations of method 1700 may be implemented by a base station 105 or its components as described herein. For example, the operations of method 1700 may be performed by a cell specification manager as described with reference to FIGS. 11 through 15. In some examples, a base station 105 may execute a set of codes to control the functional elements of the device to perform the functions described below. Additionally or alternatively, the base station 105 may perform aspects the functions described below using special-purpose hardware.

At block 1705, the base station 105 may configure a first subset of a set of time resources as independent time resources of a first cell of a plurality of cells and configure a second subset of the set of time resources as independent time resources of a second cell of the plurality of cells. The operations of block 1705 may be performed according to the methods described with reference to FIGS. 1 through 6. In certain examples, aspects of the operations of block 1705 may be performed by a resource allocation component as described with reference to FIGS. 11 through 13.

At block 1710, the base station 105 configure a third subset of the set of time resources as shared time resources of the first cell and the second cell. The operations of block 1710 may be performed according to the methods described with reference to FIGS. 1 through 6. In certain examples, aspects of the operations of block 1710 may be performed by a operation component as described with reference to FIGS. 11 through 13.

At block 1715, the base station 105 may identify a first control region within one or more subframes of the third subset of the set of time resources, the first control region allocated for control information associated with the first cell, and identify a second control region within the one or more subframes of the third subset of the set of time resources, the second control region allocated for control information associated with the second cell. The operations of block 1715 may be performed according to the methods described with reference to FIGS. 1 through 6. In certain examples, aspects of the operations of block 1715 may be performed by a subframe identification component as described with reference to FIGS. 11 through 13.

At block 1720, the base station 105 may determine whether a UE is configured for operating in one or both of the first cell or the second cell. The operations of block 1720 may be performed according to the methods described with reference to FIGS. 1 through 6. In certain examples, aspects of the operations of block 1720 may be performed by a operation component as described with reference to FIGS. 11 through 13.

At block 1725, the base station 105 may transmit control information associated with the first cell in the first control region or transmit control information associated with the second cell in the second control region. The operations of block 1725 may be performed according to the methods described with reference to FIGS. 1 through 6. In certain examples, aspects of the operations of block 1725 may be performed by a communication component as described with reference to FIGS. 11 through 13.

At block 1730, the base station 105 may identify a subframe of the set of resources for communication with the UE based at least in part on the determining and communicate with the UE during the identified subframe. The operations of block 1730 may be performed according to the methods described with reference to FIGS. 1 through 6. In certain examples, aspects of the operations of block 1730 may be performed by a subframe identification component or a communication component as described with reference to FIGS. 11 through 13.

Figure 18:
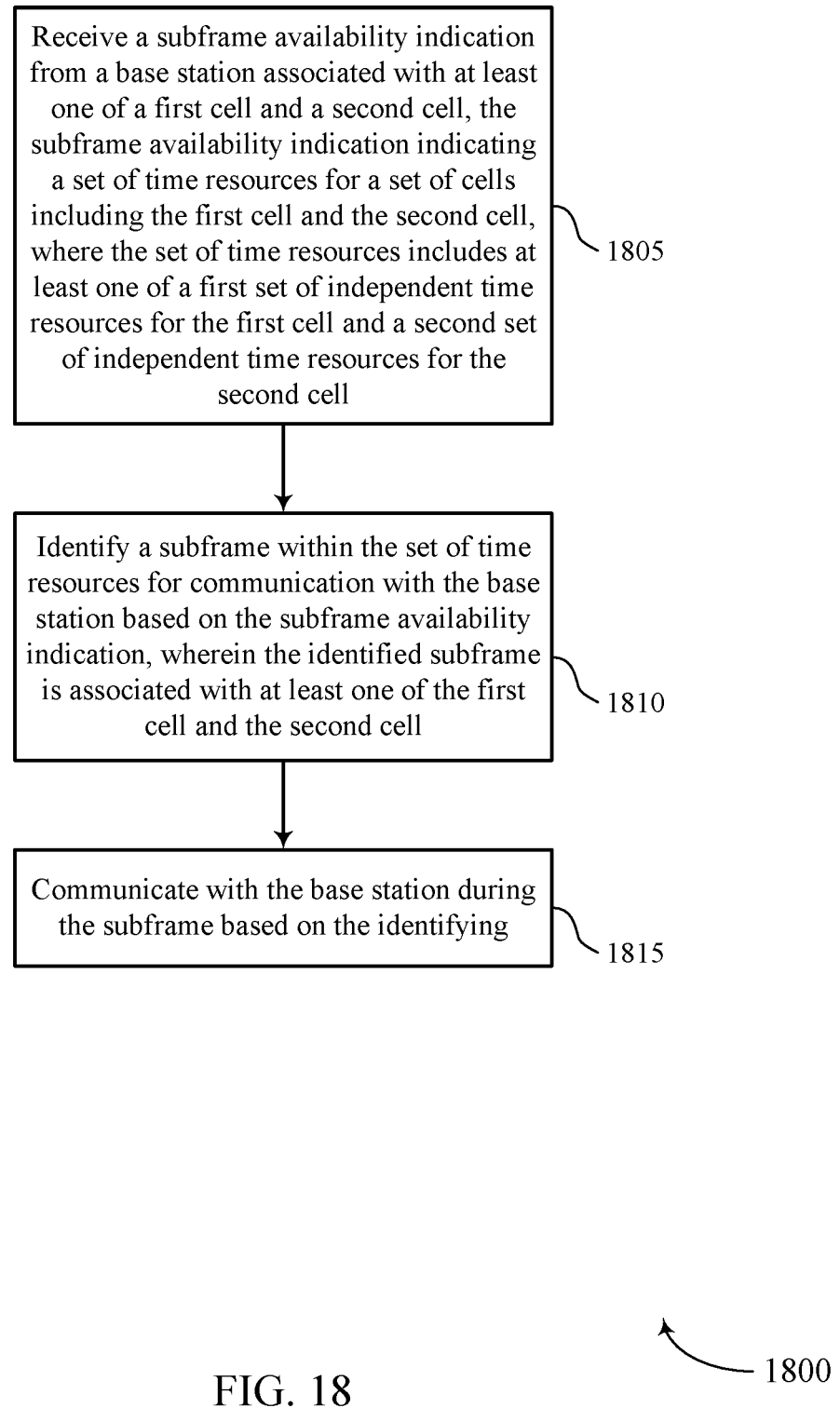

FIG. 18 shows a flowchart illustrating a method 1800 for cell level isolation for network slicing and network sharing in accordance with one or more aspects of the present disclosure. The operations of method 1800 may be implemented by a UE 115 or its components as described herein.

For example, the operations of method 1800 may be performed by a UE cell specification manager as described with reference to FIGS. 7 through 14. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive a subframe availability indication from a base station associated with at least one of a first cell and a second cell, the subframe availability indication indicating a set of time resources for a set of cells including the first cell and the second cell, where the set of time resources include at least one of a first set of independent time resources for the first cell and a second set of independent time resources for the second cell. The operations of block 1805 may be performed according to the methods described with reference to FIGS. 1 through 6. In certain examples, aspects of the operations of block 1805 may be performed by a subframe indication component as described with reference to FIGS. 7 through 14.

At block 1810 the UE 115 may identify a subframe within the set of time resources for communication with the base station based at least in part on the subframe availability indication, wherein the identified subframe is associated with at least one of the first cell and the second cell. The operations of block 1810 may be performed according to the methods described with reference to FIGS. 1 through 6. In certain examples, aspects of the operations of block 1810 may be performed by a subframe identification component as described with reference to FIGS. 7 through 14.

At block 1815 the UE 115 may communicate with the base station during the subframe based at least in part on the identifying. The operations of block 1815 may be performed according to the methods described with reference to FIGS. 1 through 6. In certain examples, aspects of the operations of block 1815 may be performed by a communication component as described with reference to FIGS. 7 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) CCs as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
configuring a first subset of a set of time resources of a carrier as independent time resources for a first network slice;
configuring a second subset of the set of time resources as independent time resources for a second network slice;
assigning the first network slice to a first cell of a plurality of cells and the second network slice to a second cell of the plurality of cells;
determining whether a user equipment (UE) is configured for operating using one or both of the first cell or the second cell;

identifying a subframe of the set of time resources for communication with the UE based at least in part on the determining; and communicating with the UE during the identified subframe.

2. The method of claim 1, wherein the UE is configured for operating using the first cell, the method further comprising:

receiving a request from the UE for communication via the second network slice; and configuring the UE for communication via the second cell.

3. The method of claim 2, wherein the configuring the UE for communication via the second cell comprises configuring the second cell as a secondary cell for the UE or as a second primary cell for the UE.

4. The method of claim 1, wherein the UE is configured for operating using the first cell, the method further comprising:

configuring a third subset of the set of time resources as independent time resources for a third network slice;

assigning the third network slice to the first cell;

identifying a handover of the UE from the first cell to a third cell;

determining that the third cell excludes support for one of the first network slice or the second network slice; and configuring the UE for communication via the third cell and a fourth cell, the fourth cell associated with a fourth network slice corresponding to the one of the first network slice or the second network slice.

5. The method of claim 4, wherein the configuring the UE for communication via the fourth cell comprises configuring the fourth cell as a secondary cell for the UE or as a second primary cell for the UE.

6. The method of claim 1, further comprising:

configuring a third subset of the set of time resources as shared time resources for the first cell and the second cell.

7. The method of claim 6, further comprising:

identifying a first control region within one or more subframes of the third subset of the set of time resources, the first control region allocated for control information associated with the first cell;

identifying a second control region within the one or more subframes of the third subset of the set of time resources, the second control region allocated for control information associated with the second cell;

transmitting control information associated with the first cell in the first control region; and transmitting control information associated with the second cell in the second control region.

8. The method of claim 7, wherein:

the first control region comprises a first set of symbol periods of the one or more subframes and the second control region comprises a second set of symbol periods of the one or more subframes, the second set of symbol periods being non-overlapping with the first set of symbol periods.

9. The method of claim 7, wherein:

the first control region comprises a first set of sub-carriers and the second control region comprises a second set of sub-carriers, the second set of sub-carriers being non-overlapping with the first set of sub-carriers.

10. The method of claim 7, wherein:

the first control region comprises a first set of control channel elements (CCEs) within a control channel; and the second control region comprises a second set of CCEs within the control channel.

11. The method of claim 1, further comprising:

scheduling a first subframe of the first subset of the set of time resources for downlink or uplink communication with at least one UE of a first set of UEs; and scheduling a second subframe of the second subset of the set of time resources for downlink or uplink communication with at least one UE of a second set of UEs, the second set of UEs being disjoint from the first set of UEs.

12. The method of claim 1, further comprising:

configuring a third subset of the set of time resources as independent time resources for a third cell of the plurality of cells;

determining that a second UE is configured for operating using the third cell;

identifying a second subframe of the set of time resources for communication with the second UE based at least in part on the determination that the second UE is configured for operating using the third cell; and communicating with the second UE during the second subframe.

13. The method of claim 1, further comprising:

determining at least one of a discontinuous reception (DRX) timer or a hybrid automatic repeat request (HARM) timer for the first cell based at least in part on a number of subframes configured for the first cell.

14. The method of claim 1, further comprising:

transmitting a subframe availability indication to the UE, the subframe availability indication indicating subframe partition information of the first cell and the second cell.

15. The method of claim 14, wherein:

the subframe availability indication is transmitted via system information, a radio resource control channel, or a broadcast channel.

16. The method of claim 1, further comprising:

transmitting, using a first waveform, a first synchronization signal or a first broadcast channel for the first cell using a portion of the first subset of the set of time resources.

17. The method of claim 16, further comprising:

transmitting, using a second waveform different from the first waveform, a second synchronization signal or a second broadcast channel for the second cell using a portion of the second subset of the set of time resources.

18. The method of claim 1, wherein communicating with the UE comprises:

transmitting, to the UE, a shared synchronization signal or a shared broadcast channel for the first cell and the second cell using at least a portion of the set of time resources.

19. The method of claim 1, wherein:

the first cell is associated with a first public land mobile network (PLMN) and the second cell is associated with a second PLMN different from the first PLMN.

20. The method of claim 1, further comprising:

configuring the set of time resources according to a cell time division multiplexing (TDM) cycle comprising one or more radio frames, wherein the first and second subsets of the set of time resources comprise respective subsets of subframes of the one or more radio frames.

21. A method for wireless communication, comprising:

receiving a subframe availability indication from a base station associated with at least one of a first cell or a second cell, the subframe availability indication indicating a configuration of a set of time resources for a plurality of cells including the first cell and the second cell, wherein the set of time resources comprises at least one of a first set of independent time resources for a first network slice assigned to the first cell or a second set of independent time resources for a second network slice assigned to the second cell;

identifying a subframe within the set of time resources for communication with the base station based at least in part on the subframe availability indication, wherein the identified subframe is associated with at least one of the first cell or the second cell; and communicating with the base station during the subframe based at least in part on the identifying.

22. The method of claim 21, wherein the subframe availability indication indicates a configuration of a set of time resources comprising the first set of independent time resources for the first network slice assigned to the first cell and the second set of independent time resources for the second network slice assigned to the second cell.

23. An apparatus for wireless communication, in a system comprising:
a processor;
memory coupled with the processor; and
instructions stored in the memory and executable by the processor, to cause the apparatus to:
configure a first subset of a set of time resources as independent time resources for a first network slice assigned to a first cell of a plurality of cells;
configure a second subset of the set of time resources as independent time resources for a second network slice assigned to a second cell of the plurality of cells;
determine whether a user equipment (UE) is operating in one or both of the first cell or the second cell;
identify a subframe of the set of time resources for communication with the UE based at least in part on the determining; and
communicate with the UE during the identified subframe using at least a portion of the set of time resources.

24. An apparatus for wireless communication, in a system comprising:
a processor;
memory coupled with the processor; and
instructions stored in the memory and executable by the processor, to cause the apparatus to:
receive a subframe availability indication from a base station associated with at least one of a first cell or a second cell, the subframe availability indication indicating a set of time resources for a plurality of cells including the first cell and the second cell, wherein the set of time resources comprises at least one of a first set of independent time resources for a first network slice assigned to the first cell or a second set of independent time resources for a second network slice assigned to the second cell;
identify a subframe within the set of time resources for communication with the base station based at least in part on the subframe availability indication, wherein the identified subframe is associated with at least one of the first cell or the second cell; and
communicate with the base station during the subframe based at least in part on the identifying.

25. The apparatus of claim 24, wherein the subframe availability indication indicates that at least a portion of the set of time resources is shared between the first cell and the second cell.

26. The apparatus of claim 25, wherein the instructions are further executable by the processor to cause the apparatus to:
identify at least a portion of a carrier that is shared between the first cell and the second cell based at least in part on the subframe availability indication.

27. The apparatus of claim 26, wherein the instructions executable by the processor to cause the apparatus to communicate with the base station during the subframe are executable by the processor to cause the apparatus to:
communicate with the base station using the identified portion of the carrier.

28. The apparatus of claim 25, wherein the instructions executable by the processor to cause the apparatus to identify the subframe within the set of time resources are executable by the processor to cause the apparatus to:
identify a common subframe shared between the first cell and the second cell based at least in part on the subframe availability indication.

29. The apparatus of claim 28, wherein the instructions executable by the processor to cause the apparatus to communicate with the base station during the subframe are executable by the processor to cause the apparatus to:
communicate with the base station during the identified common subframe.

30. The apparatus of claim 24, wherein the subframe availability indication indicates that at least a portion of the set of time resources is shared between each of the plurality of cells.

31. The apparatus of claim 24, wherein the instructions are further executable by the processor to cause the apparatus to:
monitor a first control region for the first cell;
determine a first radio bearer for communication via the first cell based at least in part on monitoring the first control region; and
communicate with a base station supporting the first cell using the determined first radio bearer.

32. The apparatus of claim 24, wherein the instructions are further executable by the processor to cause the apparatus to:
monitor a second control region for the second cell;
determine a second radio bearer for communication via the second cell based at least in part on monitoring the second control region, the second radio bearer different from the first radio bearer; and
communicate with a base station supporting the second cell using the determined second radio bearer.

33. The apparatus of claim 24, wherein the instructions are further executable by the processor to cause the apparatus to:
receive a control channel configuration from the base station, the control channel configuration indicating a first control region for the first cell or a second control region for the second cell.

34. The apparatus of claim 33, wherein the instructions are further executable by the processor to cause the apparatus to:
determine a shared control region for the first cell and the second cell based at least in part on the received control channel configuration.

35. The apparatus of claim 24, wherein:
the subframe availability indication indicates a number of subframes associated with the first cell; and
at least one of a discontinuous reception (DRX) timer or a hybrid automatic repeat request (HARQ) timer for the first cell is based at least in part on the number of subframes associated with the first cell.

36. The apparatus of claim 24, wherein the subframe availability indication is received via system information, a radio resource control channel, or a broadcast channel.

37. The apparatus of claim 24, wherein the subframe availability indication indicates a configuration of a set of time resources comprising the first set of independent time resources for the first network slice assigned to the first cell and the second set of independent time resources for the second network slice assigned to the second cell.

* * * * *